US011726810B2

(12) United States Patent
Beberman

(10) Patent No.: US 11,726,810 B2
(45) Date of Patent: *Aug. 15, 2023

(54) SYSTEMIC EXTENSIBLE BLOCKCHAIN OBJECT MODEL COMPRISING A FIRST-CLASS OBJECT MODEL AND A DISTRIBUTED LEDGER TECHNOLOGY

(71) Applicant: Prasaga, LLC, Las Vegas, NV (US)

(72) Inventor: David Alan Beberman, Jefferson, MA (US)

(73) Assignees: PRASAGA FOUNDATION, Zug (CH); David Beberman, Jefferson, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,974

(22) Filed: Jun. 21, 2022

(65) Prior Publication Data

US 2022/0326981 A1    Oct. 13, 2022

Related U.S. Application Data

(63) Continuation of application No. 16/560,856, filed on Sep. 4, 2019, now Pat. No. 11,436,039.

(60) Provisional application No. 62/843,392, filed on May 4, 2019.

(51) Int. Cl.
| G06F 7/06 | (2006.01) |
| G06F 9/46 | (2006.01) |
| G06F 9/448 | (2018.01) |
| G06F 9/54 | (2006.01) |
| G06F 9/455 | (2018.01) |
| H04L 9/06 | (2006.01) |
| G06F 9/38 | (2018.01) |
| H04L 9/32 | (2006.01) |
| H04L 9/00 | (2022.01) |

(52) U.S. Cl.
CPC ............ *G06F 9/466* (2013.01); *G06F 9/3836* (2013.01); *G06F 9/4492* (2018.02); *G06F 9/45508* (2013.01); *G06F 9/45558* (2013.01); *G06F 9/546* (2013.01); *H04L 9/0643* (2013.01); *H04L 9/3239* (2013.01); *H04L 9/50* (2022.05)

(58) Field of Classification Search
CPC ...... G06F 9/466; G06F 9/3836; G06F 9/4492; G06F 9/45508; G06F 9/45558; G06F 9/546; H04L 9/0643; H04L 9/3239; H04L 9/50; H04L 63/10; H04L 63/12
See application file for complete search history.

(56) References Cited

U.S. PATENT DOCUMENTS

| 5,361,350 | A | 11/1994 | Conner et al. |
| 6,175,878 | B1 | 1/2001 | Seaman et al. |
| 6,378,003 | B1 | 4/2002 | Danforth |
| 10,419,209 | B1 * | 9/2019 | Griffin .................. H04L 9/3263 |
| 10,726,002 | B1 | 7/2020 | Srivastava |
| 11,188,977 | B2 * | 11/2021 | Youb .................. G06Q 30/0645 |

(Continued)

*Primary Examiner* — Timothy A Mudrick
*Assistant Examiner* — Abdou K Seye
(74) *Attorney, Agent, or Firm* — DLA Piper LLP US

(57) ABSTRACT

A method for processing one or more message passing transactions sent from one or more client computers to one or more distributed ledger accounts, of one or more distributed ledgers, executed on one or more distributed ledger nodes, the message passing transactions processed by one or more class manager infrastructure intrinsics.

20 Claims, 27 Drawing Sheets

(56) References Cited

U.S. PATENT DOCUMENTS

| | | |
|---|---|---|
| 2011/0276393 A1* | 11/2011 | Srinivasan ......... G06Q 30/0241 |
| | | 707/769 |
| 2018/0365201 A1 | 12/2018 | Hunn et al. |
| 2019/0050855 A1 | 2/2019 | Martino et al. |
| 2019/0122317 A1 | 4/2019 | Hunn et al. |
| 2020/0034353 A1 | 1/2020 | Innocenti |

* cited by examiner

SYSTEMIC EXTENSIBLE BLOCKCHAIN OBJECT MODEL COMPRISING A FIRST-CLASS OBJECT MODEL AND A DISTRIBUTED LEDGER TECHNOLOGY

CROSS REFERENCE TO RELATED APPLICATIONS

This application is a Continuation of U.S. patent application Ser. No. 16/580,856 filed Sep. 4, 2019, which claims the benefit of priority of U.S. Provisional Application No. 62/843,392, filed May 4, 2019, now U.S. Pat. No. 11,436,039. The content of both of which are incorporated herein by reference in their entireties.

FIELD

The present disclosure relates to the fields of object-oriented programming ("OOP") in a model sometimes called a first-class object model or a system object model ("SOM") and distributed ledger technology ("DLT"), also known as blockchain technology, hashchain technology, direct acyclic graph ("DAG") technology, and may be known by other names. For the purposes of this disclosure, the terms distributed ledger, DLT, blockchain, hashchain and DAG are equivalent and refer to the same technology. For the purposes of this disclosure, the terms first-class object model and SOM are equivalent and refer to the same technology.

BACKGROUND

SOM

SOM is an object instance and message passing system. SOM is a first-class object model meaning that all class objects and ordinary objects are object instances. Object instances are passed messages which are mapped to class object method implementations for the messages in a process known as message resolution and message dispatch. Object-oriented inheritance is implemented as passing messages to ancestor class objects of the class object of the object instance receiving the message. The means for passing messages to objects is implemented by a class manager library, which is loaded as part of every application process that uses SOM, by an operating system. The class manager library manages the instantiation of all object instances, references to all object instances, and passing messages to the object instances located by an object reference. A reference to an object may be a memory pointer or opaque handle to the location of the object instance. The aspects message resolution and message dispatching of a first-class object model may be referred to as late dynamic binding.

To create a new object instance of a given class object, a message is passed to a class object which instantiates the new object instance. A class object which instantiates a new object instance that is a class object instance, is known as a metaclass. This means that metaclass objects create class objects, and class objects create ordinary objects, and the class object of a class object is a metaclass object. Any class object that inherits from an ancestor metaclass object is a metaclass object.

Creating new class objects from metaclass objects introduces new method implementations to SOM applications, where the code for a new method may be statically linked to the application or dynamically loaded at runtime. The class manager library is responsible for the creation and management of all object instances, but it is not responsible for executing the method implementation code. Instead the class manager library's message dispatch calls the method code, which may be implemented in executable format, such as machine instructions, virtual machine bytecode, or source code. In this manner SOM is termed language neutral with respect to class method implementations.

All object references created by a SOM class manager library refer to object instances that are part of a running SOM application process on an operating system. A class manager library may support passing messages to object instances across SOM application processes running on the operating system, with object references that are unique across all SOM application processes running on the same operating system.

Examples of such systems are found in U.S. Pat. Nos. 5,361,350; 6,378,003 B1; and GO Corporation's Penpoint Operating System, "Penpoint API Reference", Jul. 1, 1992, ISBN-13:978-0201608625

Object references may be unique across all SOM application processes running on one operating system, but are not unique across multiple operating systems. A SOM class manager library may not directly pass messages to object instances on one operating system from another operating system solely by a class manager library object reference. To support distributed computing, SOM applications commonly implement proxy objects that send and receive messages to objects in SOM applications on distributed systems. Proxy client and proxy server objects perform object reference mappings between the SOM application processes. Locating object instances in SOM applications on distributed systems requires a persistent, standardized, trusted global index of locations, independent of, but accessible by all operating systems and SOM applications.

The instantaneous state of each SOM application and the objects contained therein, on each operating system on each distributed system is dynamic, asynchronous and non-deterministic, which makes it intractable to maintain such a global index. Therefore, no such persistent, standardized, trusted global index for SOM class manager object references exists.

DLT

A DLT or blockchain is a trusted, immutable, replicated database of strictly sequenced transactions acting on ledger accounts. A plethora of computing systems, termed as nodes, are networked together such that each node independently has an identical copy of the replicated database. The state of a ledger account is derived from the processing of all sequenced transactions acting upon the ledger account. The strictly sequenced transactions acting on ledger accounts is defined to be deterministic with respect to the transactions. Therefore, nodes may maintain identical state of a ledger account derived independently from the replicated database of transactions, by sequentially processing all transactions acting on the ledger account.

A client computing system, which may also be a node, creates a transaction request and sends the transaction request to a node. New transaction requests received by a node are processed, added to the database and are distributed to other nodes to maintain a synchronized copy of the replicated database among all the nodes. A processed transaction includes the transaction request, and results from processing the transaction request. There are a wide and growing variety of means to distribute the transactions to the nodes. The means for agreeing on the ordering of transactions is known as a consensus algorithm. There are a wide and growing variety of consensus algorithms in use by DLTs. The consensus algorithm maintains immutability of the replicated database across the nodes.

The state of the art for ledger accounts and ledger account state consists of accounts referenced by globally unique values, termed as account addresses; and state information that may include fields for current values, known as cryptocurrency balances; fields for account state specific data; and fields for account state specific code, commonly known as smart contracts. A transaction acting on a ledger account may call a procedure on a smart contract passing arguments to the smart contract, resulting in output and a new ledger account state derived from the execution of the called procedure.

To create a new smart contract, given the state of the art for DLT, a new transaction received by a node, containing new smart contract code acting on an a priori specified ledger account, results in the creation of a new ledger account with account state that includes the new smart contract code. Transactions acting on the new ledger account may then call procedures defined in the new smart contract. A first smart contract may call a procedure in a second smart contract passing execution control to the ledger account state of the second smart contract, or may use the second smart contract as a library of procedures calling the procedures without passing control to the ledger account state of the second smart contract.

Programming languages for smart contracts may include object-oriented programming constructs implemented by an associated programming language compiler but smart contracts do not support a first-class object model. DLTs do not support late dynamic binding. Specifically, a DLT does not implement a class manager library such that a metaclass object can create a new class with new code in an already existing ledger account, adding the new object instances and new code to the existing leger account's state. Further, a DLT does not implement a class manager library such that a new object instantiated in a first ledger account state may inherit from a class object instantiated in a second ledger account state, and further inherit from a third or more ancestor class object instantiated in a third or more ledger account state. Thus, every DLT ledger account that executes a smart contract must contain in its account state explicit smart contract code. An existing ledger account may not, by the addition of a new object instance to its account state, have new functionality added to it by reference to the class object of the new object instance.

Although DLTs with smart contracts have seen a variety of uses, drawbacks to smart contracts comprise:

A lack of a first-class object model forcing developers to rely on manual coding conventions for reusing code libraries;

A smart contract must be explicitly written to include a level of indirection to replace a call to a procedure in one library with a new procedure in a different library: This increases the difficulty level of writing smart contracts forcing developers to anticipate in advance, future use-cases for their smart contracts;

All smart contract data associated with a user ledger account are maintained solely in individual smart contract accounts, commonly stored by user account address, without a reference to the smart contracts from the user account state: Searching for all data associated with a user's account requires querying over all smart contract accounts on the DLT, which may become intractable with increasing number of smart contract accounts;

Examples of DLTs are "Bitcoin: A Peer-to-Peer Electronic Cash System", Satoshi Nakamoto, https://bitcoin.org/en/ bitcoin-paper, and "Ethereum White Paper, A Next Generation Smart Contract & Decentralized Application Platform", Vitalik Buterin, https://whitepaperdatabase.com/ethereum-eth-whitepaper/, Sep. 1, 2017.

What is needed is a means for implementing a first-class object model on a DLT comprising:

A class manager library that enables referencing object instances within ledger account states by references that are globally unique to all ledger accounts;

further to enable deterministic message dispatching between object instances contained in different ledger account states;

further to enable late dynamic binding of object-oriented message passing to class objects and ancestor class objects;

further to enable new object instantiation by message passing to class object instances;

further to enable new class object instantiation by message passing to metaclass object instances, including enabling dynamically loading of new class method implementations into existing ledger account states;

further to enable creation of new ledger accounts by message passing to object instances that have class method able to create new ledger accounts.

Objects

Some of the objects of the present disclosure, which at least one embodiment herein satisfies, are as follows:

It is an object of the present disclosure to ameliorate one or more problems of the prior art or to at least provide a useful alternative;

Another object of the present disclosure is to provide a computer implemented system and method for realizing a systemic first-class object model on a distributed ledger;

Other objects and advantages of the present disclosure will be more apparent from the following description, which is not intended to limit the scope of the present disclosure.

SUMMARY

Such a combination of a first-class object model and a DLT is termed a systemic extensible blockchain object model ("XBOM") to distinguish it from a system object model, or a DLT with smart contracts.

Some example advantages of the present disclosure comprise the following:

An XBOM would improve code reliability by increasing the amount of code reuse through inheritance for developers;

An XBOM would reduce new DLT applications by reducing the amount of new code needed for a developer to write through inheritances;

An XBOM would enable novel architectures through the use of object-oriented concepts such as object containment and traversal within and across ledger account states;

An XBOM would eliminate the need for separate smart contract ledger accounts for many applications, as each user account may contain arbitrary object instances with class methods that implement features equivalent to the smart contracts;

An XBOM is independent of the programming language implementing a class's methods enabling mixing of programming languages in a class inheritance tree, leaving the choice of programming language up to the developer of each individual class;

DLT applications that use an XBOM to place object instances in user ledger accounts may reduce the complexity of data sharding of the DLT, increasing opportunities for parallel code execution while maintaining determinism.

The present disclosure describes methods and systems, including computer-implemented methods, computer-program products, and computer systems for a distributed ledger based system and a first-class object model.

In one embodiment, a ledger account managed by a DLT is defined to comprise at least an account address, and a verification value for a current state of the account. The verification value may be the output of a SHA256 hash applied to the account state, where the account state is defined to be a virtual memory space indexed by an address value of sufficient length to cover the memory space bounds, (e.g. $2^N-1$). The ledger account state space is independently updated by nodes processing received transactions, and replicated according to the consensus algorithm for the DLT. The implementation of the nodes comprises at least a class manager infrastructure for creating and managing object instances within individual ledger account state space, and a set of intrinsic procedures for passing messages to the object instances.

The class manager infrastructure resolves references to objects using an opaque data type known as a ledger object identifier ("LOID"), which comprises at least an account address and an object reference within the account state space of the ledger account referenced by the account address field. The class manager infrastructure further resolves messages to method implementations with a method ID ("MID"), which comprises at least an account address, a class object reference and a reference to a method implementation in the referenced class object. The class manager infrastructure further resolves fields to object instances with a field ID ("FID"), which comprises at least an account address, a class object reference, and a reference to the field information within the referenced class object. One of the class manager infrastructure intrinsics, ObjectSend, takes an LOID, MID, and list of arguments, resolves the LOID to a ledger account and an object instance within the ledger account's state space, resolves the class object for the object instance, resolves the message to a method in the object instance's class or ancestor class, and calls the method's implementation with the object instance and the arguments to the message.

The class manager infrastructure implements object-oriented inheritance by traversing the ancestor class tree of an object's class enabling method overriding by subclasses, where class, ancestor class and subclass object implementations may be located in separate unrelated ledger account state spaces. Inheritance and code reuse may be supported across the entire ledger account state space.

All objects instances of class objects, with the exception of the single ClassObject. All classes have ClassObject as an ancestor class. Class objects create new objects having the type of the class object. Class objects that create new class objects are known as metaclass objects. All metaclass objects, class objects and ordinary objects are referenced by LOIDs. Therefore, a ledger account state space may contain a plethora of metaclass objects, class objects, and ordinary objects.

A transaction request sent to a DLT node contains at least an LOID, MID, and list of arguments. A completed transaction after processing contains the transaction request, any output resulting from execution of the first method referenced by the MID and any nested method executions, and list of any ledger account entries and changed state verification values.

A new class may be created in a ledger account state space by a transaction request containing an LOID of a metaclass, an MID that resolves to a method that creates a new object, and arguments for a list of method implementations and fields for the new class. At least one of the arguments is a field value set to an LOID of an ancestor class that the new class inherits from. The new class may inherit from multiple ancestor classes if a plethora of ancestor classes is provided in the arguments. A new class that inherits from at least one metaclass ancestor is also a metaclass. The transaction includes the transaction request which further includes the class method implementation and class field list, such that the DLT contains sufficient information for each node to independently process the transaction, and create the new class object resulting in an identical account state space based solely on the replicated DLT transactions.

The details of one or more implementations of the subject matter of this specification disclosure are set forth in the accompanying drawing and later descriptions. Other features, aspects and advantages of the subject matter will become apparent from the descriptions, the drawings and the claims.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Class Object Instance and Ordinary Object Instance Relationship

Figure 1:
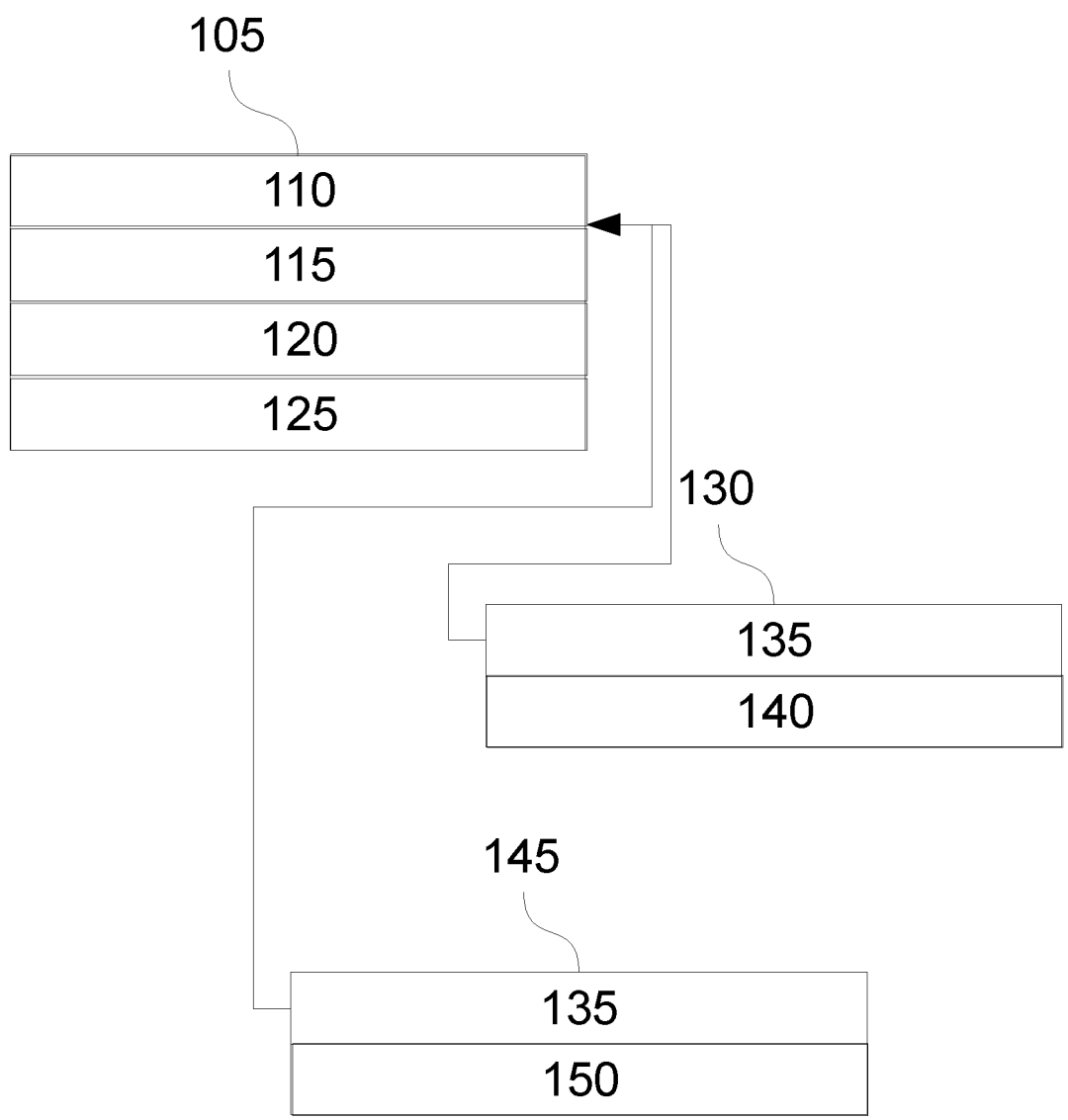
FIG. 1 is a drawing of the relationship between classes and objects for a first-class object model.

FIG. 1 illustrates the relationship between a plethora of ordinary object instances represented by 130 and 145, and the ordinary object instance's associated class object instance 105. Every object instance contains a reference to a class object instance. 135 is a class reference LOID field depicted in both object instances 130 and 145, indicating that both of object instances are instances of the same associated class object instance. 140 and 150 illustrate that each object instance's fields may have differing values reflecting the individual state of each object instance. 125 is a field containing a method table used by the class manager infrastructure for message dispatch resolution further illustrated in FIG. 12. 115 is a field referencing an associated ancestor class object instance for the class object instance 105. 120 is zero or more additional fields that class object instance 105 contains. 110 is a class reference LOID containing a reference to the class object instance associated with the class object instance 105, which is termed a metaclass. All object instances have at least one associated class object instance, with the exception of one root object instance, ClassObject, which is the only object instance without an associated class object instance.

A person skilled in the arts will readily understand that the order of the fields within the object instances 105, 130 and 145 are not meant to represent any intra-field relationship within each object instance. Instead, the only requirement is that the procedures of the class manager infrastructure are able to correctly identify and access an object instance's fields. Any correspondence of the illustrated ordering of fields in FIG. 1 and an implementation is inadvertent and unintended.

Figure 2:
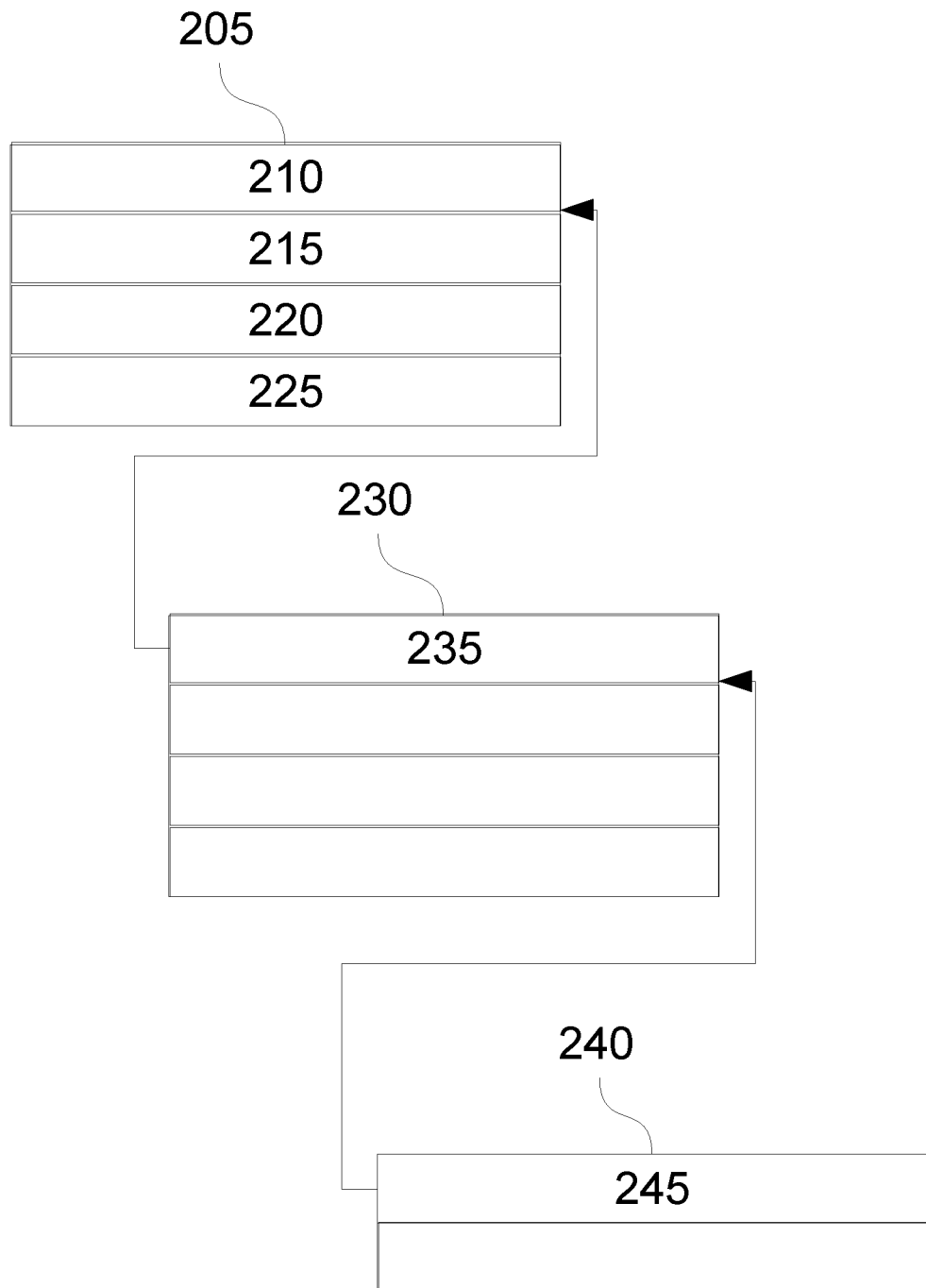
FIG. 2 is a drawing of the relationship between meta classes, classes and objects for a first-class object model.

Metaclass Object Instance, Class Object Instance and Ordinary Object Instance Relationship FIG. 2 illustrates the relationships between an ordinary object instance, a class object instance and a metaclass object instance. A class object 230 associated with ordinary object instance 240 is referenced by LOID field 245. A metaclass object 205 associated with class object instance 230 is referenced by LOID field 235, 210, 215, 220, 225 fields serve the same function as 110, 115, 120 and 125, and are included in FIG. 2 to depict a metaclass object instance to class object instance as having the same object relationship semantics as a class object instance to an ordinary object instance.

Figure 3:
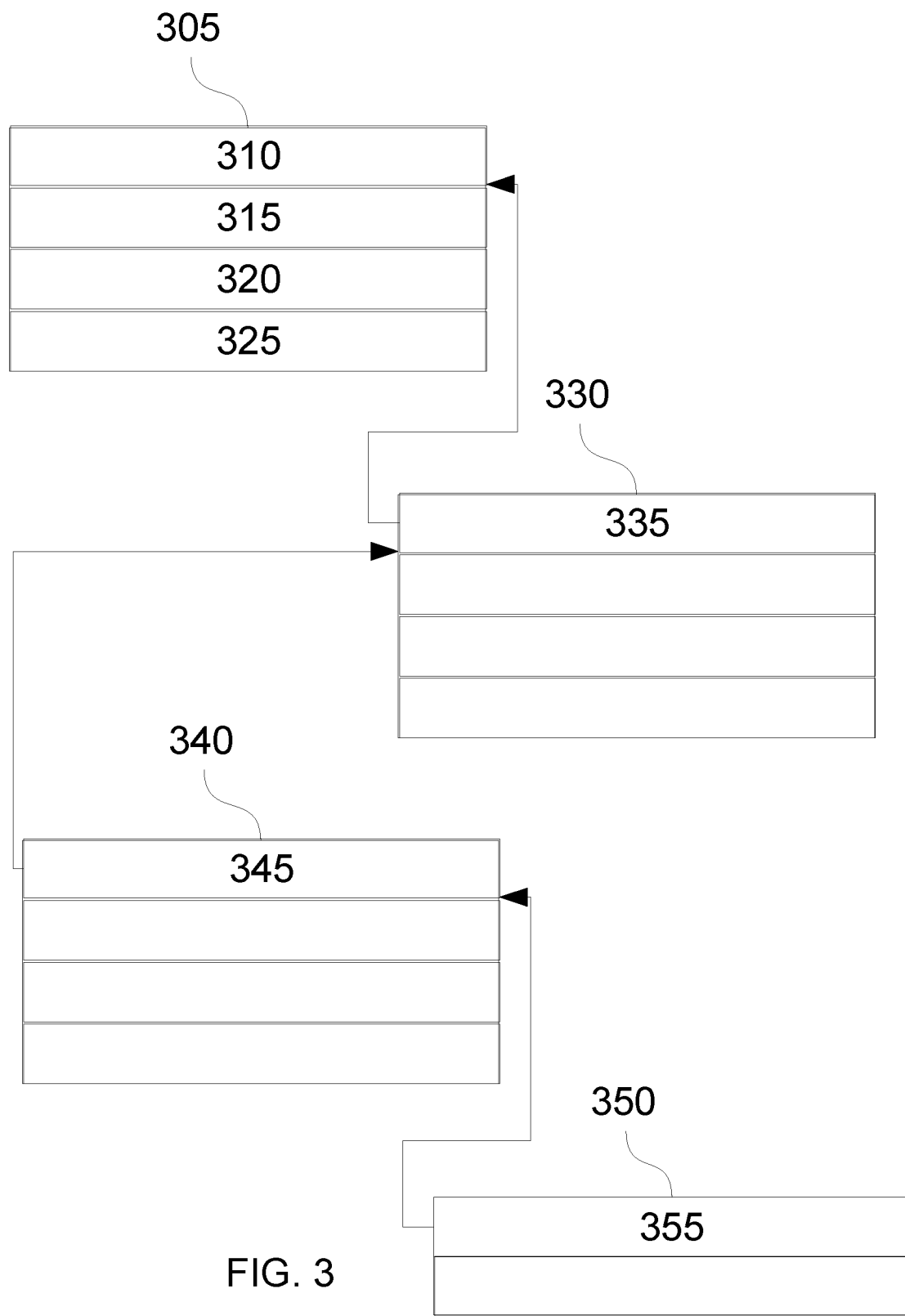
FIG. 3 is a drawing of the relationship between metameta classes, metaclasses and objects for a first-class object model.

MetaMetaclass Object Instance, Metaclass Object Instance, Class Object Instance and Ordinary Object Instance Relationship FIG. 3 illustrates the relationships between an ordinary object instance, a class object instance, a metaclass object instance and a metametaclass object instance. 355, 350, 345, 340, 335, 330, 325, 320, 315, 310 and 305 serve the same functions as the figures of FIG. 2 and FIG. 1. Combining FIGS. 1, 2, and 3 illustrates class ancestor inheritance and the metaclass object model have unlimited extensibility.

Account State Space

Figure 4:
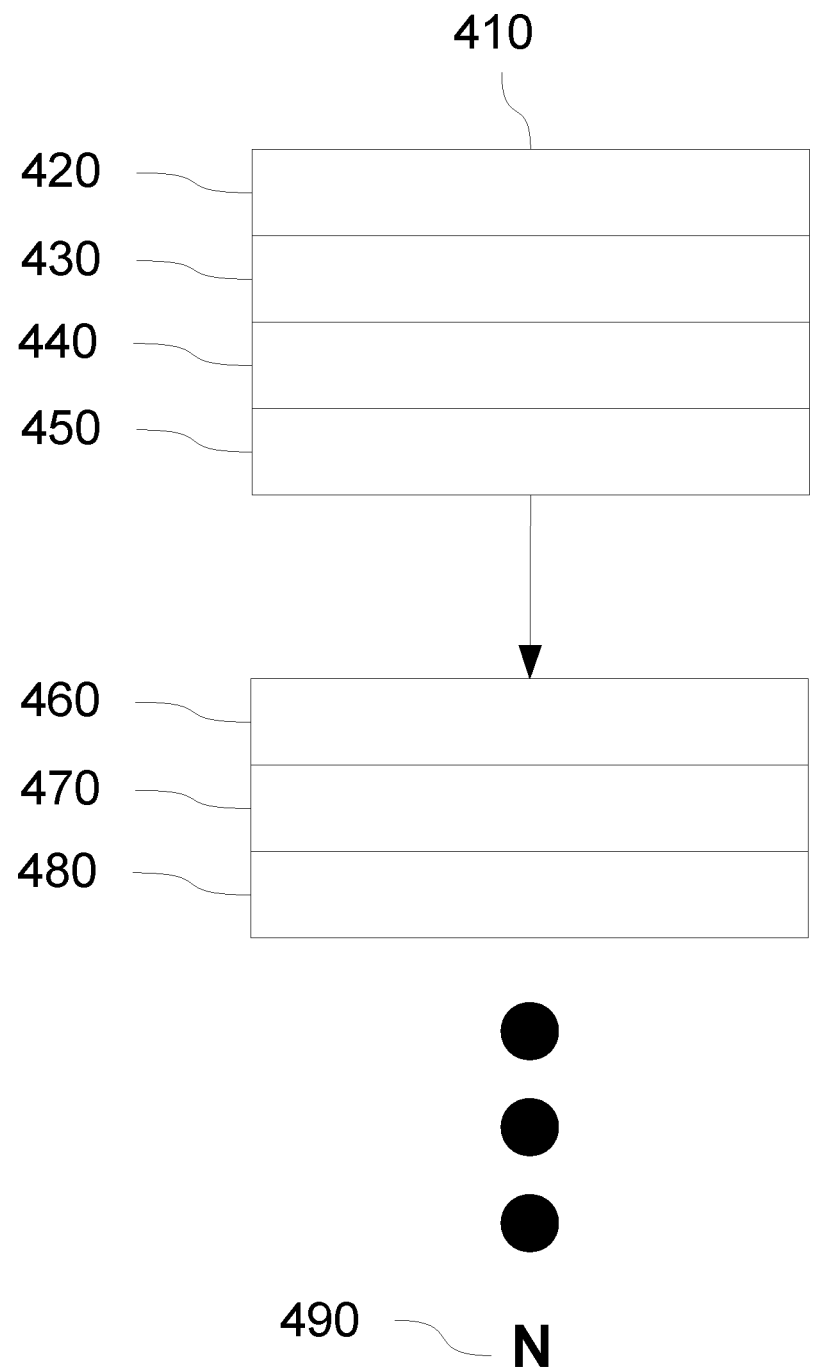
FIG. 4 is a drawing of an account state address space.

Each ledger account has an associated state space derived by the receiving of messages and execution of methods on object instance's states stored in the ledger account's state space. FIG. 4 illustrates an account state space of data words. 410 is the base for the account state space. All accesses to the account state space are offset from 410, 420 to 490 depict offsets from 410 to account state space entries, where each offset is strictly greater than all previous offsets. A break between 450 and 460 depicts offsets to the account state space that do not exist. Any access to non-existent account state space by any code results in a runtime error and failure to complete transaction execution. Account state space is considered to be bounded solely by the maximum size an offset value may hold. In one embodiment, a maximum size of $2^N-1$, where N is 32, bounds the account state space for an account at 4 Gig of data words.

Ledger Account Entry

Figure 5:
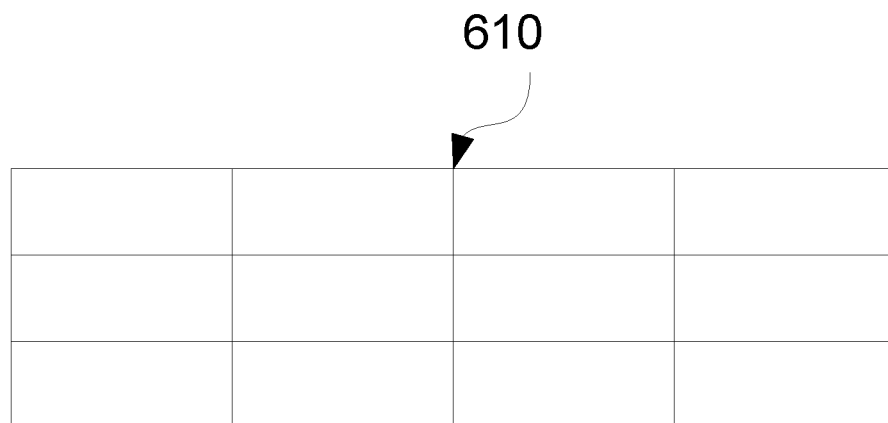
FIG. 5 is a drawing of a ledger entry for an account.

FIG. 5 illustrates a ledger account entry. 510 is an account address for the ledger account entry. 520 is a low collision value representing the current state of the account state space FIG. 4 associated with the ledger account entry. In one embodiment the low collision value is a hash of the current values of all of the data words in the account state space. 530 is a list of flags which are created and managed by the class manager infrastructure to provide additional information about a ledger account entry. In one embodiment a flag describes the contents of the account state space associated with the ledger account entry as containing either object instances managed by the class manager infrastructure or a list of arbitrary bytes. 540 is a value used as a transaction identifier to order all transactions on an account represented by the ledger account entry. The value is sequentially incremented for each transaction included in a block on a blockchain or distributed ledger. In one embodiment 540 is termed a "nonce".

Distributed Ledger

Figure 6:
FIG. 6 is a drawing of a ledger containing a plethora of ledger entries for accounts.

FIG. 6 illustrates a distributed ledger comprising a list of ledger account entries FIGS. 5. 610 to 620 depicts the distributed ledger which is stored and replicated at one or more nodes. The ledger account entries are accessed by the value of account addresses 510. The maximum account address value bounds the maximum size of the distributed ledger. In one embodiment, a maximum value of $2^N-1$, where N is 256, bounds the distributed leger size of ledger account entries.

Ledger Object Identifier, Method Identifier, and Field Identifier.

Figure 7:
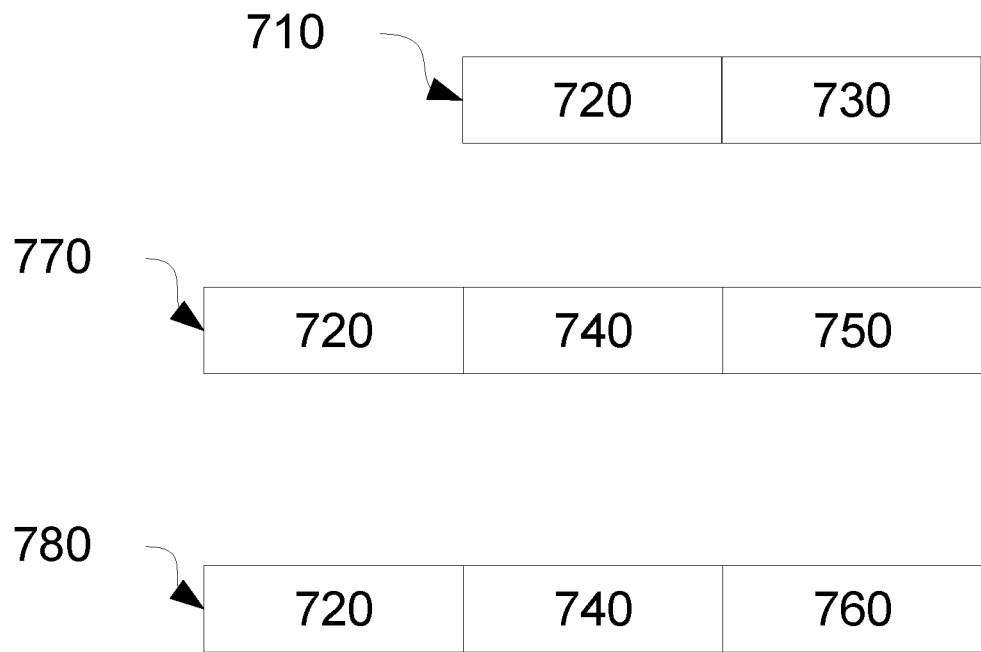
FIG. 7 is a drawing of an object reference in an account, called a ledger object identifier ("LOID"); a method identifier ("MID"), and a field identifier ("FID").

FIG. 7 illustrates a Ledger Object Identifier ("LOID") 710, a Method Identifier ("MID") 770, and a Field Identifier ("FID") 780.

The structure of an LOID comprises an account address 720 referencing a ledger account entry FIG. 5 in a distributed ledger FIG. 6., and an object instance reference 720 contained within the account state space FIG. 4 referenced by the account address. Each account address is unique, each object instance in an account state space is located at a unique offset. The combination of an account address and an object instance reference as a LOID value comprises a unique reference to an object instance. In a first embodiment the object instance reference may be an offset value in the account state space referenced by the account address. In a second embodiment the object instance reference may be an arbitrary value managed by the class manager infrastructure that may be resolved to a unique offset value in the account state space. A person skilled in the arts will readily understand that other mappings of the object instance reference to the account state space are possible.

The structure of a MID 770 comprises: an account address 720; a class object instance reference 740; and method reference 750. A MID references zero or more method implementations in the class object referenced by the class object instance reference and ancestor classes to the class object. See MessageDispatch FIG. 12 and ObjectCallAncestor FIG. 13 for message resolution.

The structure of FID 780 comprises: an account address 720; a class object instance reference FIG. 740; and a field reference FIG. 760. A FID references a unique field defined by the class object or an ancestor class of an object instance.

Node Execution Environment

Figure 8:
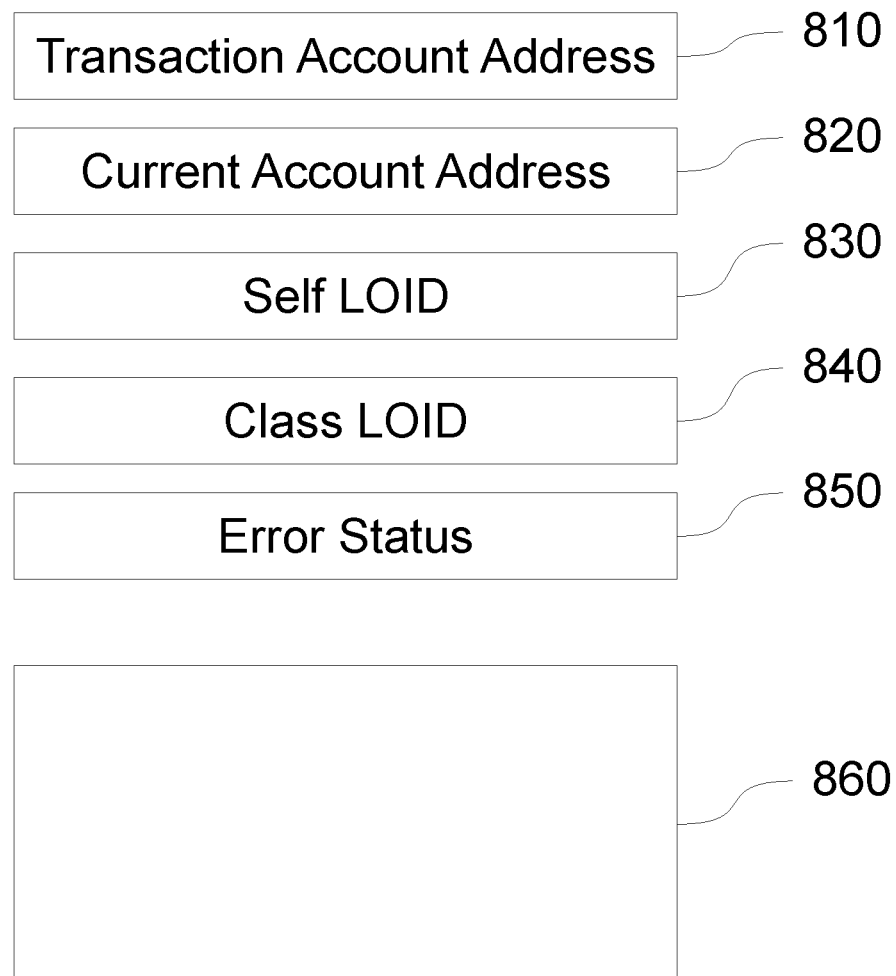
FIG. 8 is a drawing of a register set and local memory for a node execution engine ("NEE").

FIG. 8 illustrates registers used by the class manager infrastructure during execution of the class manager infrastructure intrinsic comprising: Transaction Account Address register 810; Current Account Address register 820; Self LOID register 830; Class LOID register 840, Error Status register 850; and execution stack space 860.

A person skilled in the arts will readily understand that in addition to the registers of FIG. 8, an embodiment comprises common CPU registers such as an instruction pointer register, working registers and similar. Further, the registers of FIG. 8 in an embodiment may be stored in variables on the execution stack, or by any other means provided the values are accessible by the class manager infrastructure.

Message Transaction Processing

Figure 9:
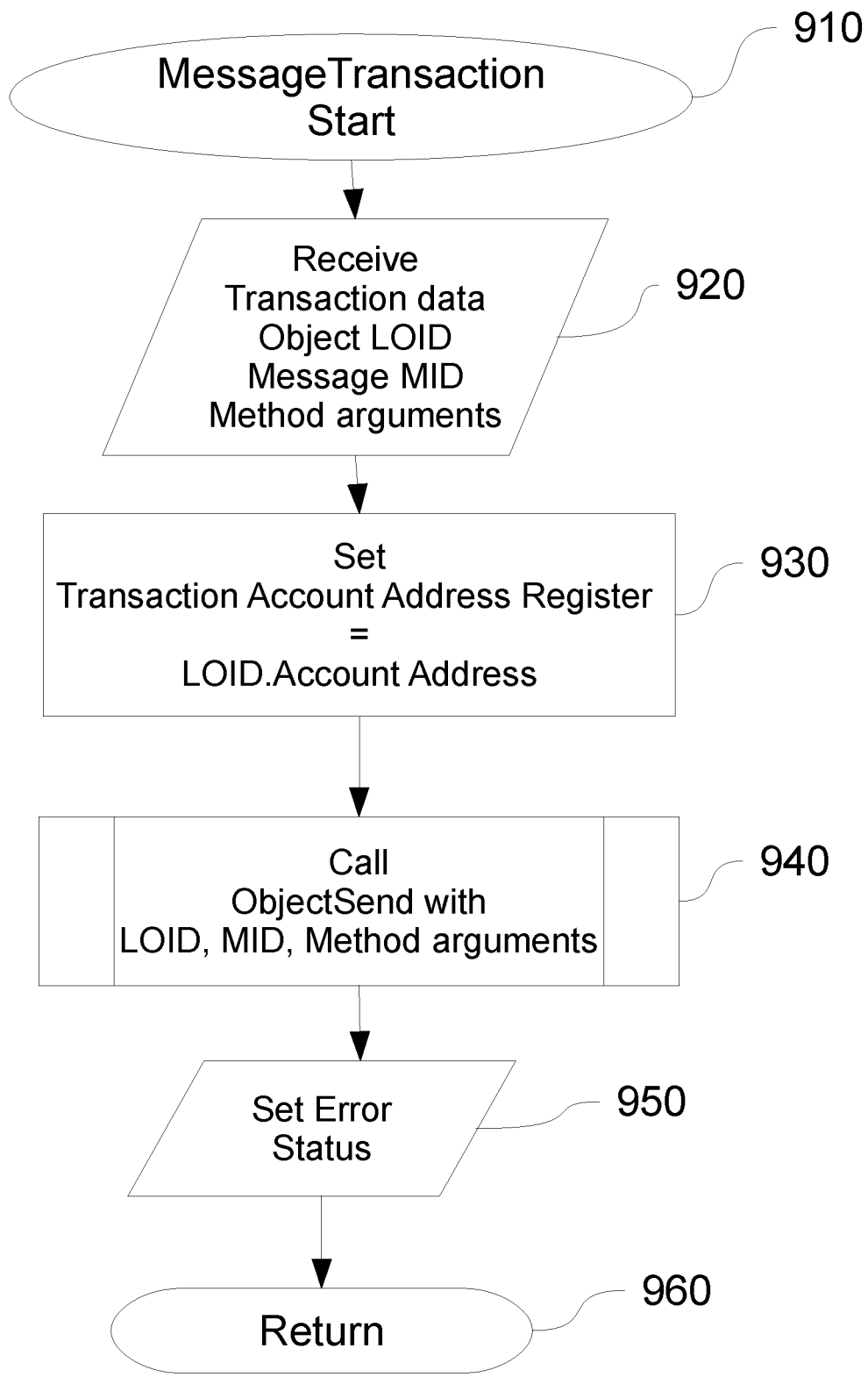
FIG. 9 is a drawing of a processing flowgraph of a received transaction message by a node.

FIG. 9 illustrates a processing flowgraph for a received message transaction. Processing starts at 910 and proceeds to 920 where received transaction data arguments comprise an LOID, a MID and Method arguments. At 930 the Transaction Account Address register 810 is set to the Account Address 710 portion of the LOID argument. Setting this register establishes the transaction account address for the duration of the execution of the received message transaction, and is a read-only value until processing completion at 960. At 940 the processing flow calls ObjectSend with the LOID, MID and Method arguments. On return from ObjectSend at 950 the error status register 850 is set to the error result from the ObjectSend call of 940. At 960 processing returns to the caller.

ObjectSend

Figure 10:
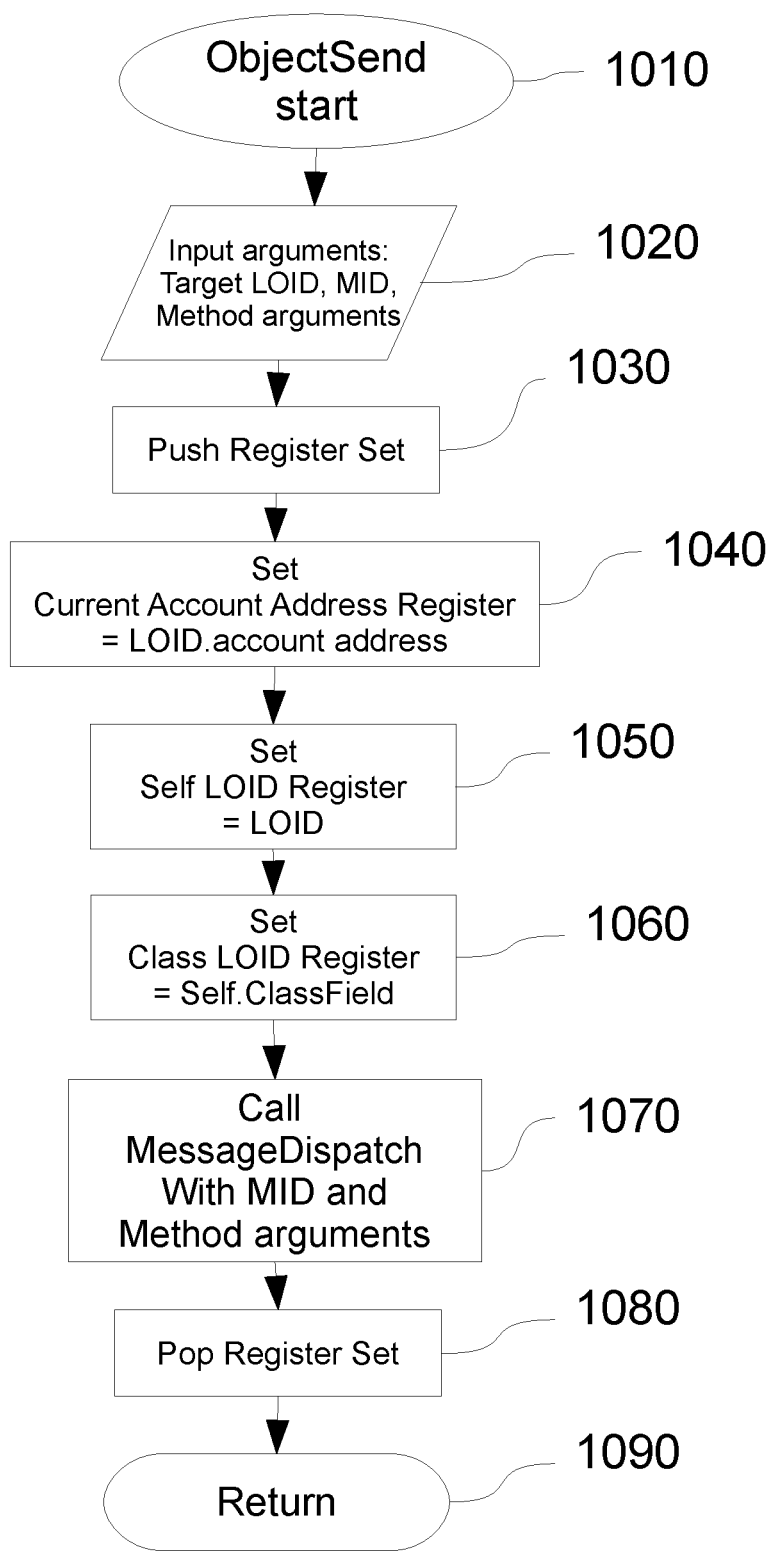
FIG. 10 is a drawing of a processing flowgraph of the ObjectSend class manager infrastructure intrinsic.

The ObjectSend class manager infrastructure intrinsic procedure is depicted in FIG. 10 drawing. ObjectSend starts at 1010 and proceeds to 1020 where arguments to ObjectSend comprise: a LOID; MID; and Method arguments for a method referenced by the MID. At 1030 NEE execution state registers show in FIG. 8 are saved on a NEE runtime stack. At 1040 Current Account Address Register 820 is set to the account address portion of ObjectSend argument LOID. At 1050 the Self LOID register 830, is set to the ObjectSend argument LOID. At 10600 the Class LOID register 840, is set to the value of the field Class LOID 135, referenced by the current account address register 820 concatenated with the object reference portion of the Self LOID register. At 1070 ObjectSend calls MessageDispatch with ObjectSend argument MID and Method arguments where, as depicted in 1200 MessageDispatch, eventually results in a call to the method referenced by ObjectSend argument MID. At 1080 NEE execution state registers previously saved at 1020 are restored from the NEE runtime stack. At 1090 ObjectSend returns to the caller. A person skilled in the arts will readily understand that calls to ObjectSend and calls by ObjectSend use execution frame push and pop semantics with the NEE runtime stack, and further the saving and restoring of the execution state registers FIG. 8 may be implied by the execution frame push and pop call semantics instead of as shown explicitly at 1020 and 1080, respectively.

A person skilled in the arts will readily understand that 1040 changes the current account context for referencing objects and serves as the sole means for performing message calls between objects contained in separate account state spaces.

ObjectCall

Figure 11:
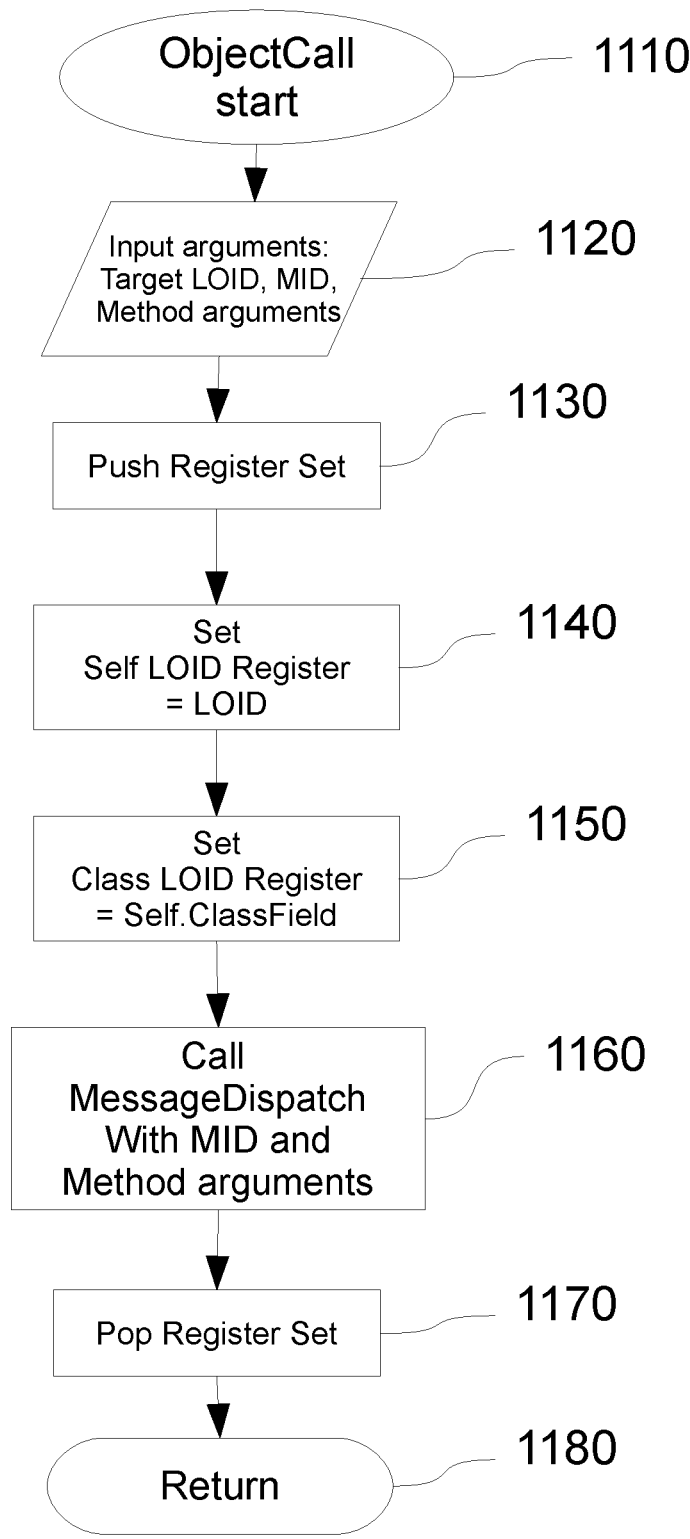
FIG. 11 is a drawing of a processing flowgraph of the ObjectCall class manager infrastructure intrinsic.

The ObjectCall class manager infrastructure intrinsic procedure is depicted in FIG. 11 drawing. ObjectCall starts at 1110 and proceeds to 1120 where arguments to ObjectCall comprise: a LOID; MID; and Method arguments for a method referenced by the MID. At 1130 NEE execution state registers shown in FIG. 8 are saved on a NEE runtime stack. At 1140 the Self LOID register 830, is set to the LOID. At 1150 the Class LOID register 840, is set to the value of the field Class LOID 135, referenced by the current account address register 820 concatenated with the object reference portion of the Self LOID register. At 1160 ObjectCall calls MessageDispatch with the MID and the Method arguments where, as depicted in MessageDispatch 1200, eventually results in a call to the method referenced by the MID. At 1170 NEE execution state registers previously saved at 1120 are restored from the NEE runtime stack. At 1180 ObjectCall returns to the caller. A person skilled in the arts will readily understand that calls to ObjectCall and calls by ObjectCall use execution frame push and pop semantics with the NEE runtime stack, and further the saving and restoring of the execution state registers FIG. 8 may be implied by the execution frame push and pop call semantics instead of as shown explicitly at 1120 and 1170, respectively.

MessageDispatch

Figure 12:
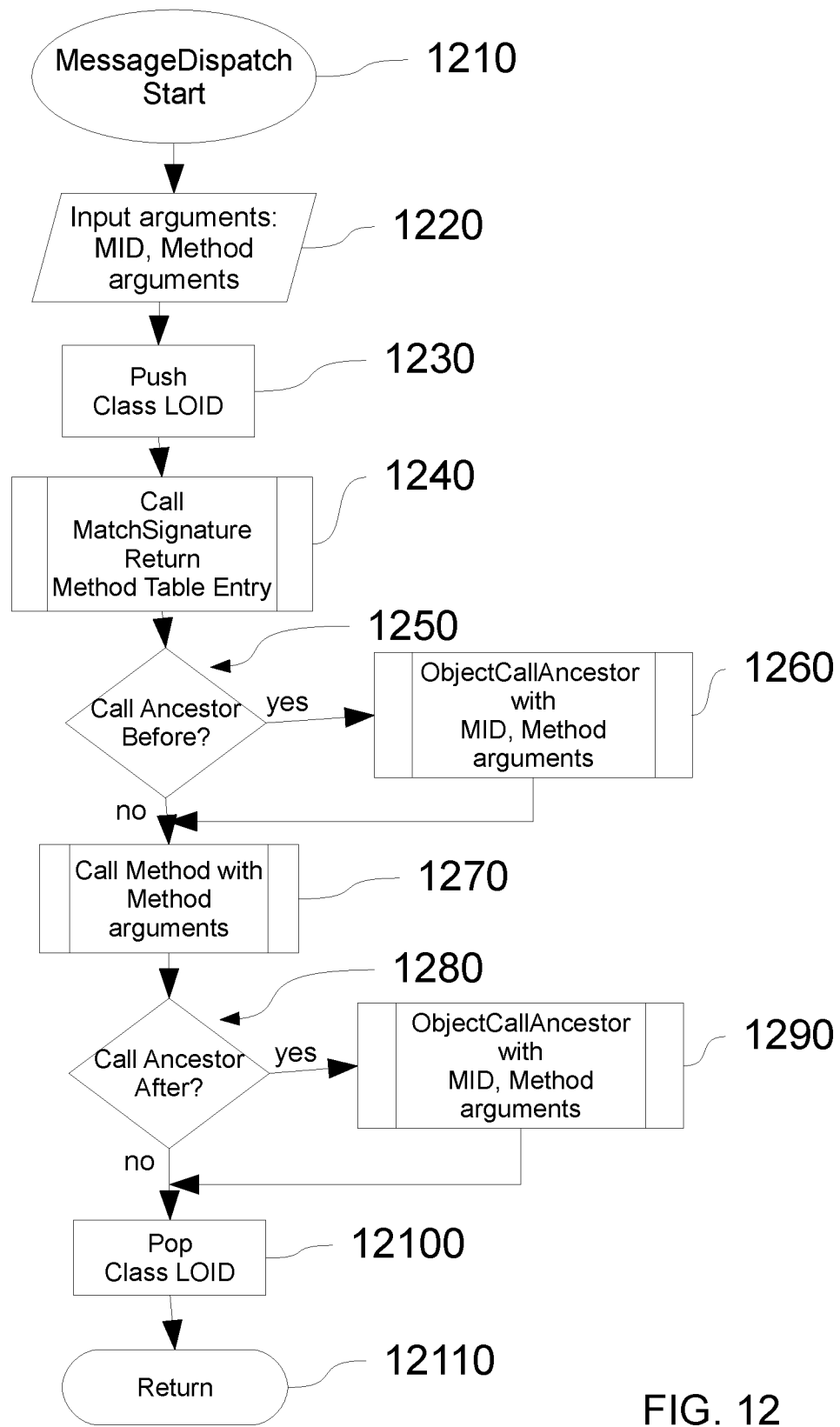
FIG. 12 is a drawing of a processing flowgraph of the MessageDispatch class manager infrastructure intrinsic.

The MessageDispatch class manager infrastructure intrinsic procedure is depicted in FIG. 12 drawing. MessageDispatch starts at 1210 and proceeds to 1220 where arguments to MessageDispatch comprise an MID and arguments for a method referenced by the MID. At 1230 the current Class LOID register 840 is saved on the execution stack 860. At 1240 MatchSignature 16130 is called which searches a class object referenced by the Class LOID register and its ancestor classes for a first method signature match and returns an associated method table entry to a method implementation. At 1250 if the method implementation indicates that any ancestor method implementation for the MID and arguments should be called prior to calling the returned method implementation, control passed to 1260 where a call to ObjectCallAncestor class manager infrastructure intrinsic performs the ancestor method call. At 1270 the method returned by MatchSignature is called with the method arguments passed in to MessageDispatch at 1220. At 1280 if the method implementation indicates that any ancestor method implementation for the MID and arguments should be called after calling the returned method implementation, control passes to 1290 where a call to ObjectCallAncestor class manager infrastructure intrinsic performs the ancestor method call. At 12100 the previously saved Class LOID register 840 at 1230 is restored from the execution stack. MessageDispatch returns to caller at 12110.

A person skilled in the arts will readily understand that in a first embodiment the Class LOID register 840 is modified by the MatchSignature call to reference the first descendant class in the object instance's ancestor classes referenced by the Self LOID register 830, and therefore is saved and restored using the node execution stack. In a second embodiment the Self LOID and Class LOID may be stored in local variables to the intrinsic, passed to and returned from a call to MatchSignature implicitly using procedure execution frames stored on the node execution stack. Other embodiments resulting in similar management of the Class LOID and Self LOID are possible without affecting the semantics of MessageDispatch.

The MessageDispatch FIG. 12 procedure uses a MID and a list of arguments to call associated method implementations in the ancestor class tree for an object, which realizes object-oriented inheritance.

ObjectCallAncestor

Figure 13:
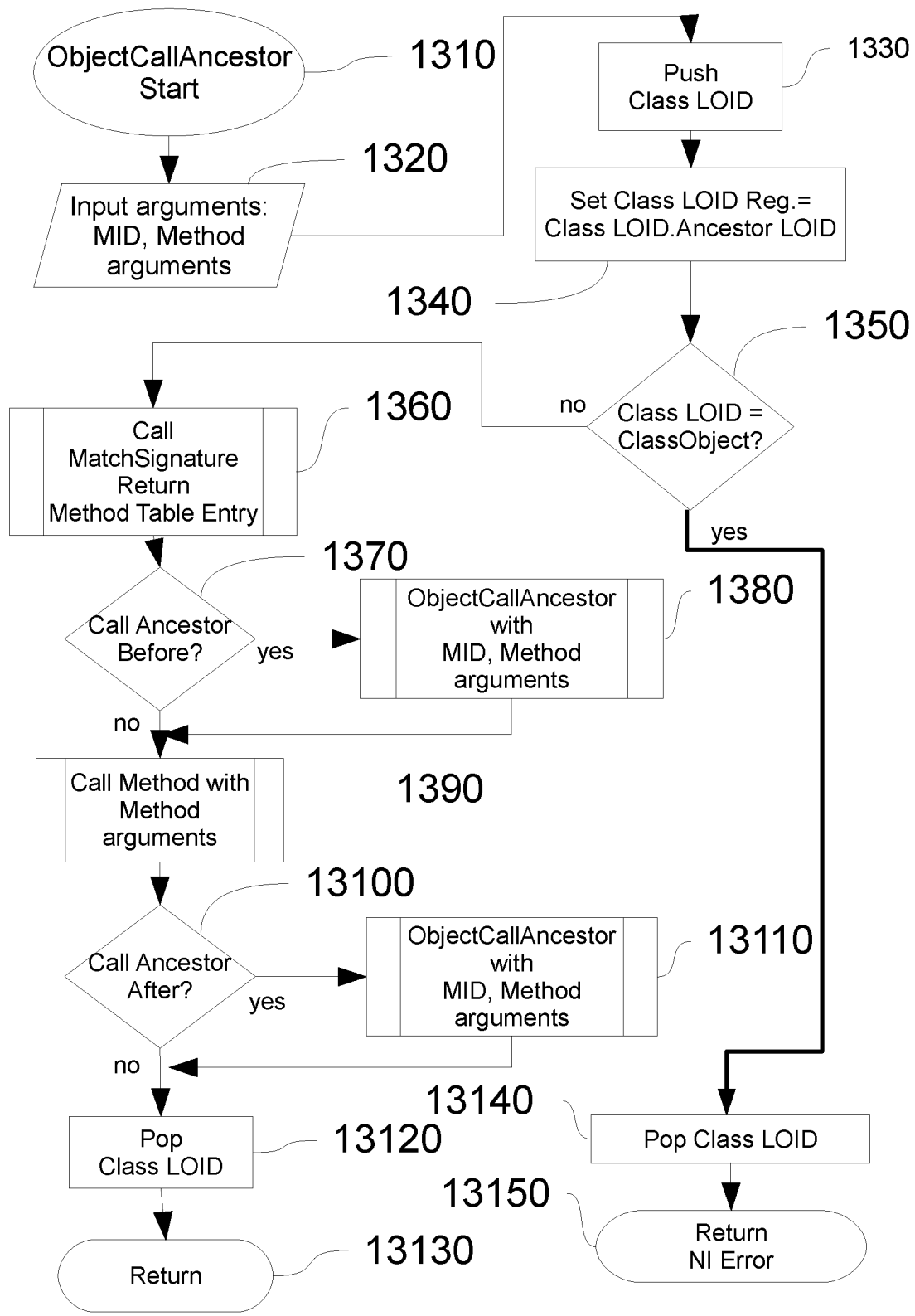
FIG. 13 is a drawing of a processing flowgraph of the ObjectCallAncestor class manager infrastructure intrinsic.

The ObjectCallAncestor class manager infrastructure intrinsic procedure is depicted in FIG. 13 drawing. ObjectCallAncestor starts at 1310 and proceeds to 1320 where arguments to ObjectCallAncestor comprise: an MID and arguments for a method referenced by the MID. At 1330 the current Class LOID register 840 is saved on the execution stack 860. At 1340 the Class LOID register is to the ancestor LOID field of the object instance that is referenced by the current Class LOID register. At 1350 the Class LOID register is compared for equality with the LOID of ClassObject.

If true, the ClassObject does not have any methods associated with it, by definition and processing continues at 13140 where the previously saved Class LOID value is restored to the Class LOID register. At 13150 a Not Implemented ("NI") error is returned to the caller.

If false, processing continues at 1360 MatchSignature 16130 is called which searches a class object referenced by the Class LOID register and its ancestor classes for a first method signature match and returns an associated method table entry to a method implementation. From 1360 to 13130 execution flow is identical to that of 1240 to 12110.

Peer Node Architecture

Figure 14:
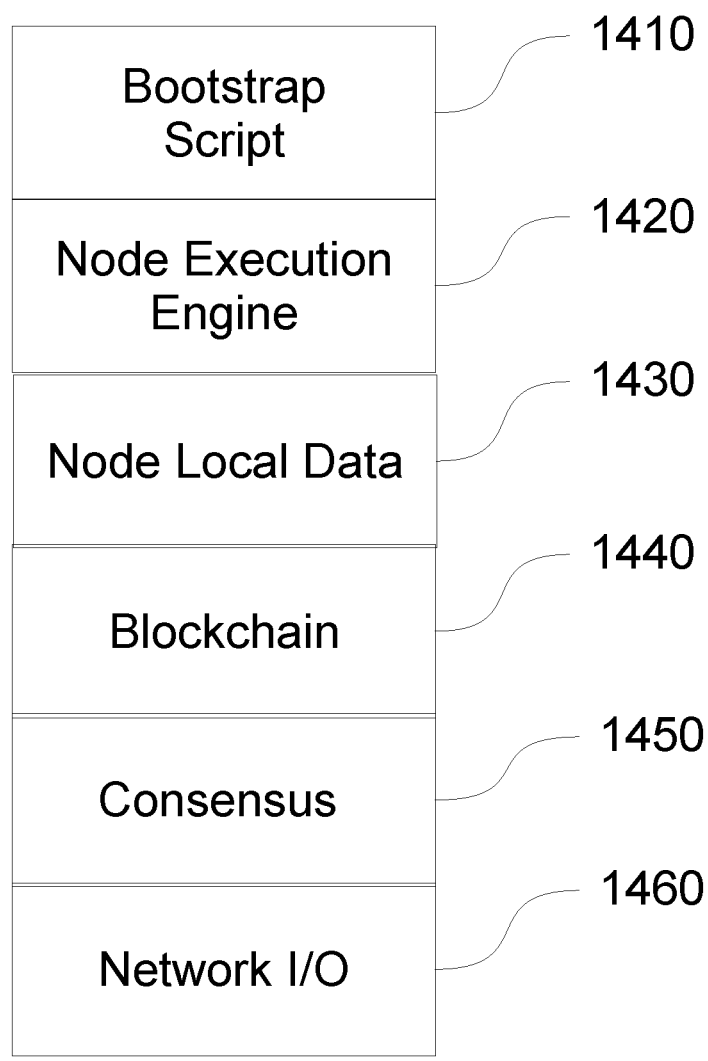
FIG. 14 is a drawing of a block diagram of the computing architecture components of a node.
Figure 15:
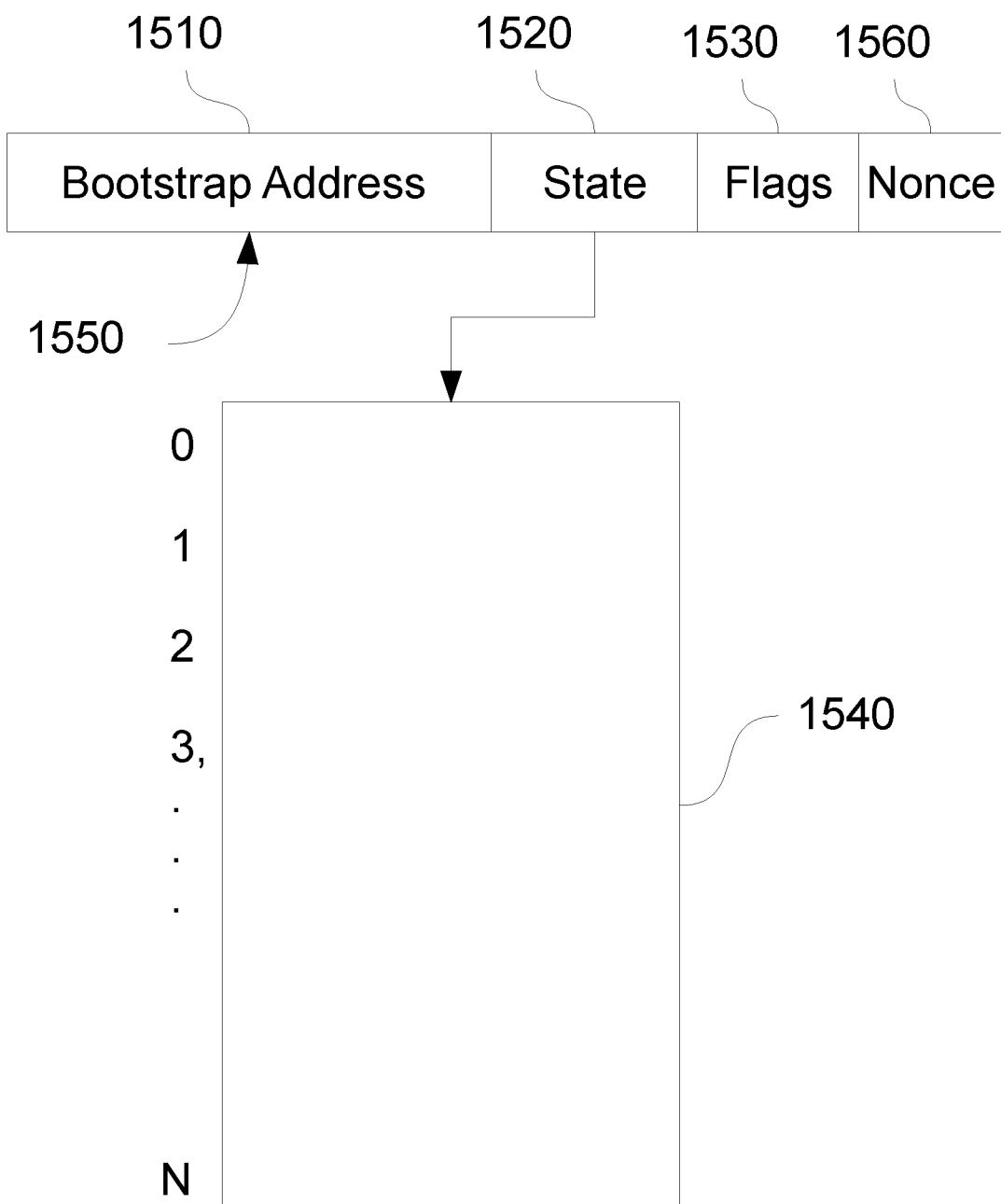
FIG. 15 is a drawing of a ledger account entry and an associated account state space for an array of bytes containing bootstrap code for the node execution engine.
Figure 25:
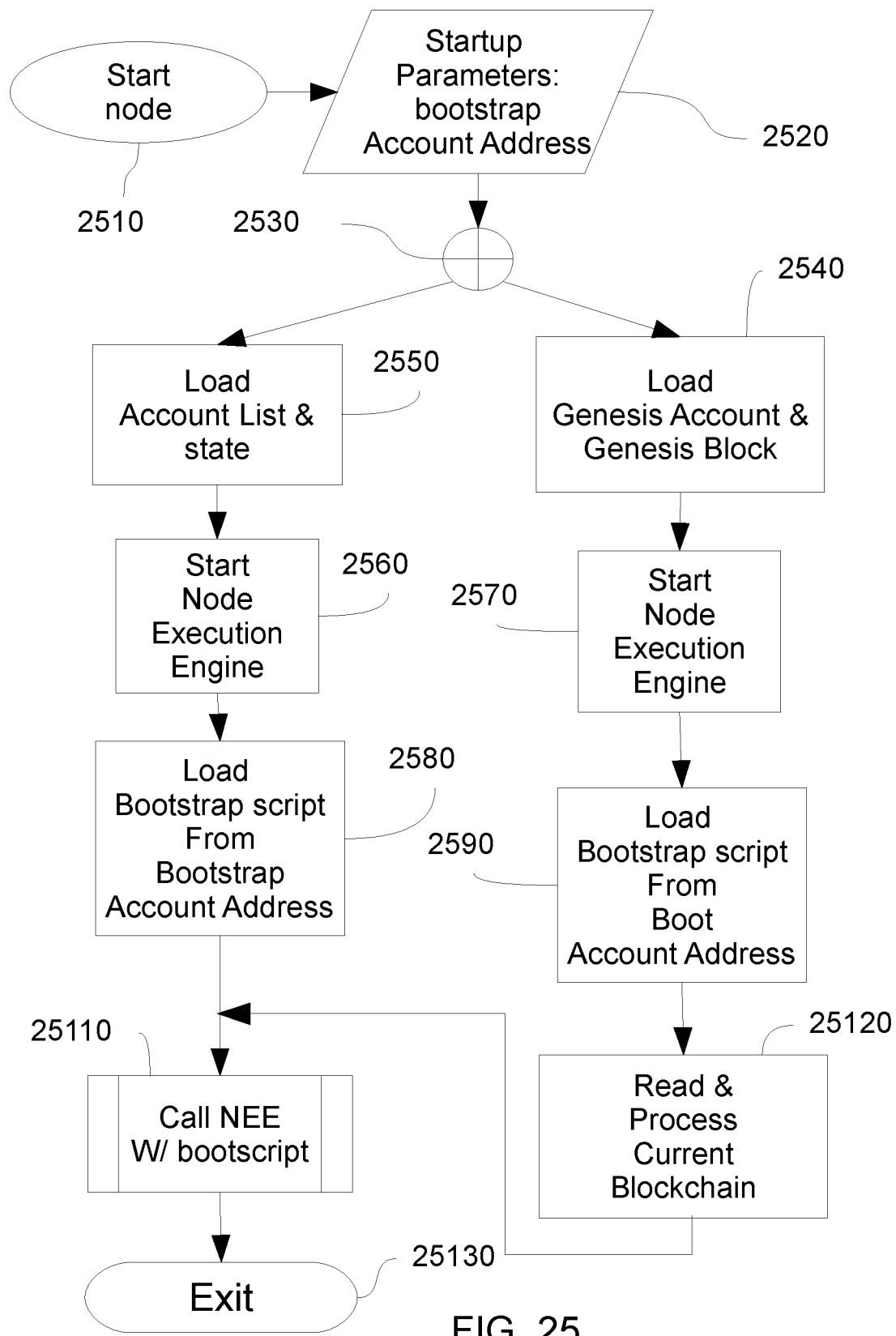
FIG. 25 is a drawing of a processing flowgraph of a node's startup and bootstrap.

FIG. 14 illustrates a node component architecture comprising: receiving, processing and forwarding transactions; and validating, storing and forwarding for replication, blocks for a blockchain or distributed ledger. 1460 depicts a network interface for receiving transactions from clients; receiving blocks from other peer nodes; transmitting transactions to other peer nodes; transmitting blocks to other peer nodes; and transmitting transaction results to clients. 1450 depicts a consensus component enabling all peer nodes to independently agree on the ordering of blocks containing zero or more transactions and transaction results. 1440 depicts a local storage component for a replicated copy of a complete blockchain or a fragment thereof. 1430 depicts a node local storage component comprising data derived from the execution of valid transactions; working data space used during processing of transactions and blocks; node local configuration data; and any other data required for operation of the node. 1420 depicts a node execution engine component comprising: a script; bytecode or binary machine execution of the class manager infrastructure, and transaction and block processing. 1410 depicts a bootstrap script component comprising a program for starting a node; receiving and processing a transaction; receiving and processing a block of transactions; transmitting a processed transaction; and transmitting a processed block. Reference to a bootstrap program is depicted in FIG. 15 and a detailed description of a bootstrap processing flowgraph is depicted in FIG. 25.

A person skilled in the arts will readily understand that the terms block and blockchain refer to any immutable, replicated, transaction list, data structure, which may include blockchains, directed acyclic graphs ("DAGs"), distributed ledgers ("DLTs"), and similar terms.

A person skilled in the arts will readily understand that a peer network architecture may include a peer-to-peer network, a message bus architecture, a store-and-forward routed network, and any network architecture that results in the delivery of replicated transactions and blocks eventually to all reachable nodes.

A person skilled in the arts will readily understand that a consensus algorithm in the consensus component in a first embodiment may be proof-of-work; in a second embodiment may be proof-of-stake; in a third embodiment may be proof-of-authority, or may be any consensus algorithm that enabled independent agreement on transaction and block ordering among a plethora of independent nodes.

Node Execution Engine Bootstrap Code

FIG. 15 illustrates an account state space containing a bootstrap code executed by the Node Execution Engine 1420 to initialize any Node Local Data 1430 and performing the node operations comprising: receiving transactions and blocks; processing transactions and blocks; and transmitting processed transactions and blocks. 1550 depicts a ledger account entry comprising: Bootstrap Address 1510 the account address for the bootstrap code; State 1520 a low collision value for the bootstrap code of 1540; Flags FIG. 1530 a flag value indicating the bootstrap account state space is an array of data words; and 1560 a nonce value for the ledger account entry.

Class Manager Infrastructure Intrinsics

Class Manager Infrastructure Intrinsics implement all object-oriented message passing procedures and provide the sole interface to node local data 1430, and for the node execution engine 1420. A list of intrinsic procedures is understood to be built-in implementations, part of a node's executable application written in the node's native operating environment.

Figure 16:
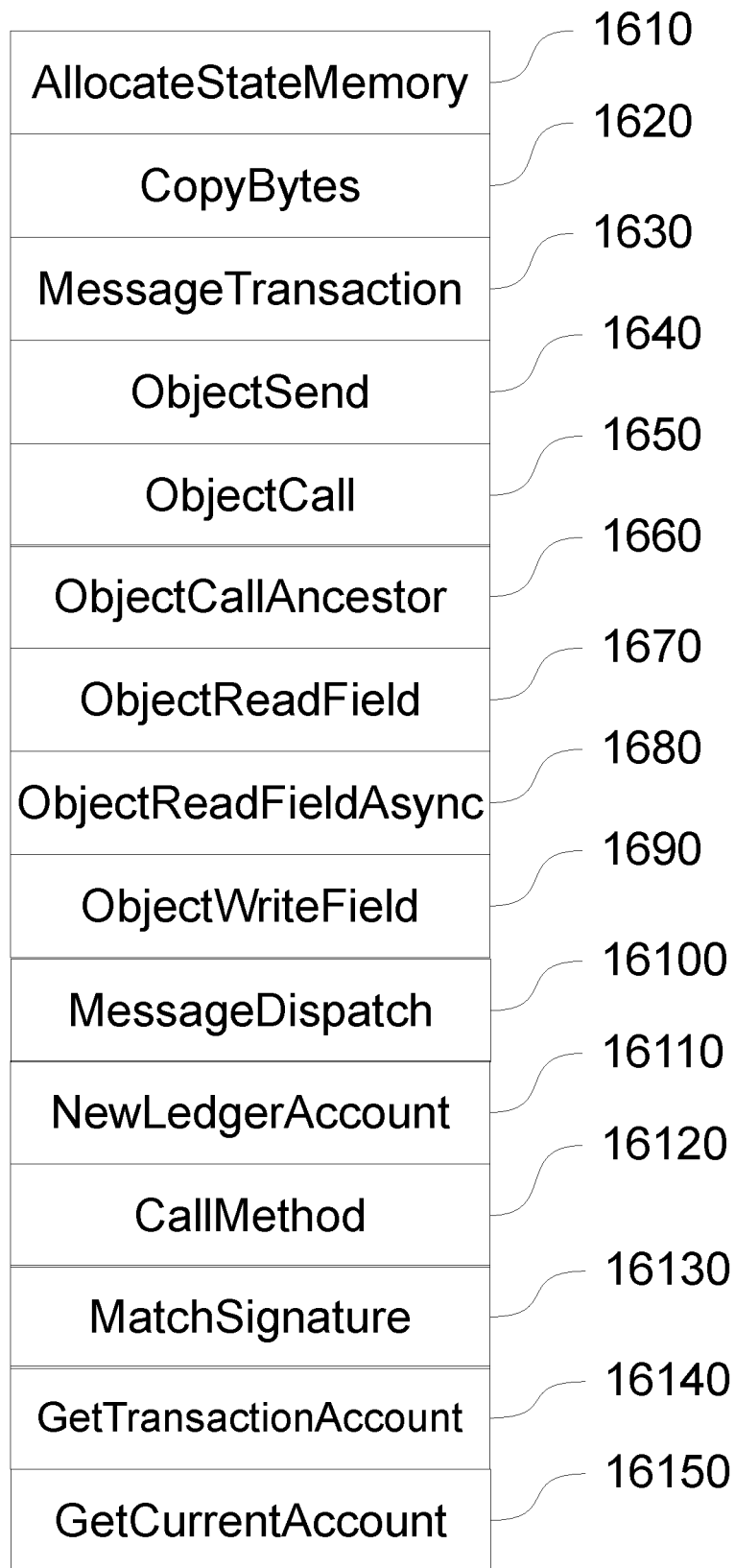
FIG. 16 is a drawing comprising a list of class manager infrastructure intrinsics.

FIG. 16 depicts a list comprising entrypoints of built-in intrinsics.

AllocateStateMemory 1610 is the entrypoint for allocating new space in an account's state space.

CopyBytes 1620 is the entrypoint for copying an array of bytes passed as an argument field in a message to an account's state space.

MessageTransaction 1630 is the entrypoint to process a transaction. Depicted in FIG. 9.

ObjectSend 1640 is the entrypoint for passing a message to a target object by first switching the current account address register to the account address of the target object depicted in FIG. 10.

ObjectCall 1650 is the entrypoint for passing a message to a target object in the account indicated by the current account register. Depicted in FIG. 11.

ObjectCallAncestor 1660 is the entrypoint for passing a message to the ancestor class of a class object of an object, implementing inheritance. Depicted in FIG. 13.

ObjectReadField 1670 is the entrypoint for reading a field of an object instance in an account state space.

ObjectReadFieldAsync 1680 is the entrypoint for reading a field of an object instance in an account state space, where the node may not have the current account state as agreed to by the consensus algorithm.

ObjectWriteField 1690 is the entrypoint for writing a field of an object instance in an account state space.

MessageDispatch 16100 is the entrypoint for implementing resolving the methods to call on an object with respect to the object's class inheritance tree. Depicted in FIG. 12.

NewLedgerAccount 16110 is the entrypoint for creating a new ledger entry with a new account address, and returns a ledger account entry. Depicted in FIG. 5.

CallMethod 16120 is the entrypoint for calling an object instance's class's method implementation for a message.

MatchSignature 16130 is the entrypoint for implementing a search for the first method in an ancestor class tree starting at a current class that matches a method signature of a message argument.

GetTransactionAccount 16140 is the entrypoint for retrieving the transaction account address register 810.

GetCurrentAccount 16150 is the entrypoint for retrieving the current account address register 820.

A person skilled in the arts will readily understand there are many equivalent means to implement built-in intrinsics, in many languages and operating environments.

Receive Transaction

Figure 17:
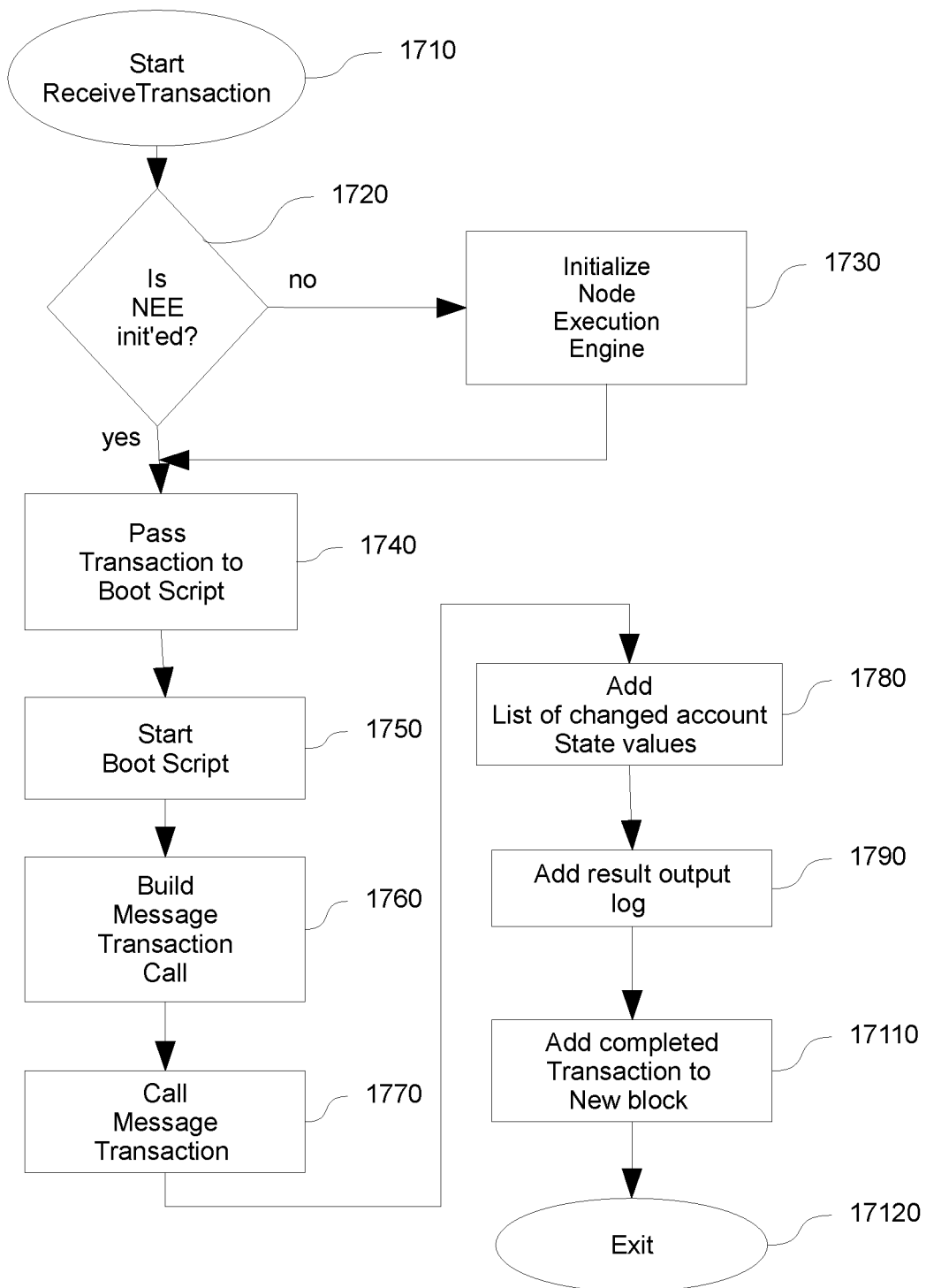
FIG. 17 is a drawing of a processing flowgraph of a node receiving a transaction and processing a transaction.

FIG. 17 illustrates a processing flowgraph for receiving a transaction by a node. Processing starts at 1710 upon reception of a transaction 2310. At 1720 of the node execution engine ("NEE") 1420 has not been initialized, then At 1730 it is initialized as illustrated in FIG. 25. At 1740 the transaction is passed to the boot script for the NEE. At 1750, the NEE starts executing the boot script proceeding to create and format and argument list and a procedure call to MessageTransaction at 1760. At 1770 MessageTransaction is called passing the argument list. Processing proceeds at 1780 on return from the MessageTransaction call adding the list of accounts and changes account state value to the processed transaction 2320 in field 2380. At 1790 the result output from MessageTransaction processing is added to the processed transaction in the field 2390. At 17110 the completed processed transaction is added to a new block. Processing terminates at 17120.

A person skilled in the arts will readily understand that a block may comprise one or a plethora of transactions, and that a node sends a block to a consensus algorithm 1450, informs peer nodes of the new block through network I/O 1460, and adds the block to a blockchain 1440 on successful completion of the consensus algorithm.

ClassAccount Subclasses

Figure 18:
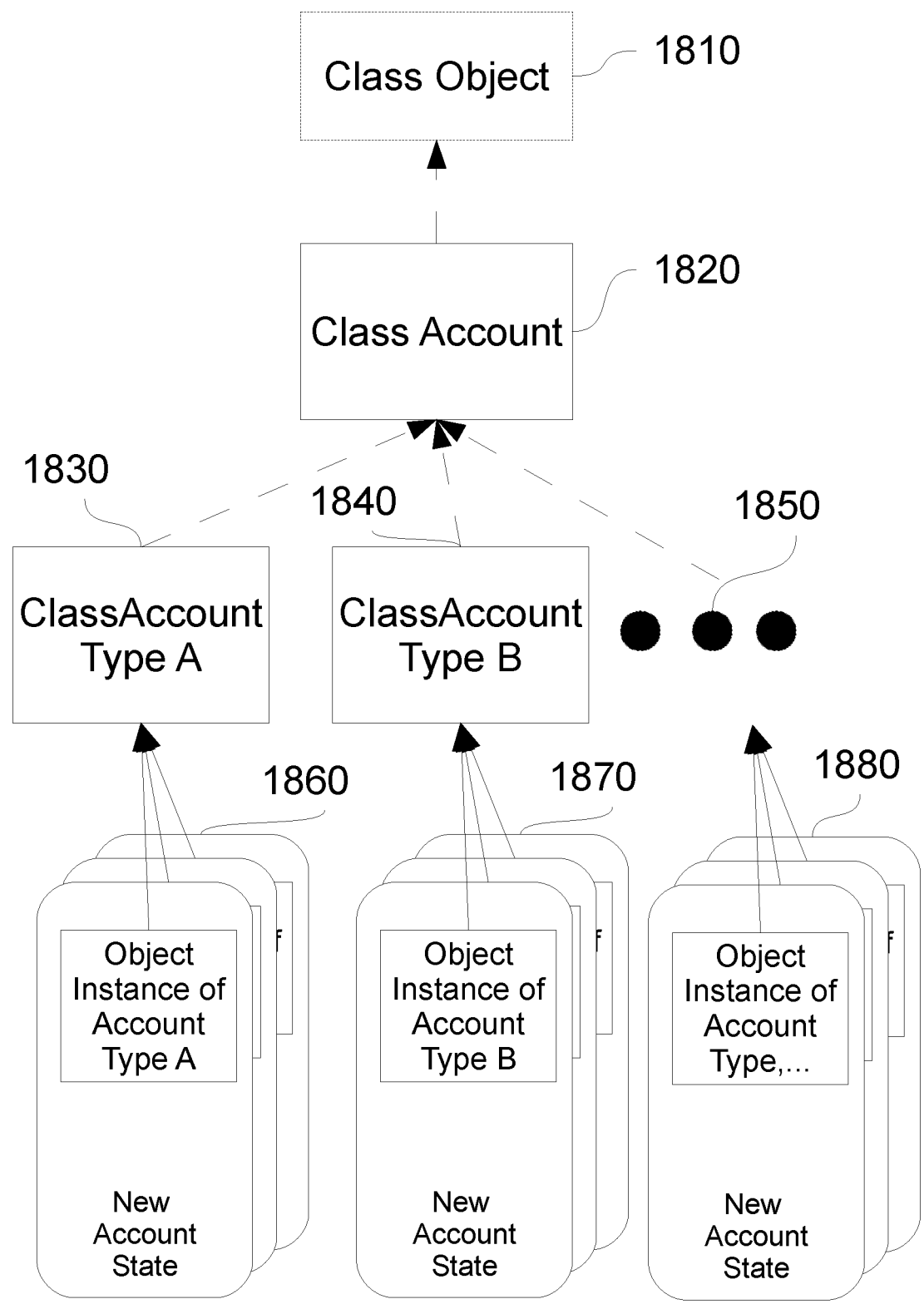
FIG. 18 is a drawing of creating new accounts, their associated account state, and a root account object instance, from subclasses of ClassAccount.

ClassAccount may be subclassed to create specific types of accounts, where the type of the account is defined by the class of the root object instance of the account. FIG. 18 illustrates an inheritance tree for ClassAccount subclasses and examples of new accounts created by the subclasses. 1820 and 1810 depict the inheritance relationship between ClassAccount and ClassObject. It should be understood that there may be a plethora of ancestor classes between ClassAccount and ClassObject. 1830, 1840 and 1850 depict a plethora of subclasses of ClassAccount. 1860, 1870, and 1880 depict a plethora of accounts created by instantiation of the respective ClassAccount subclass object instances.

A person skilled in the arts will readily understand that the class of an account root object instance may be used to indicate the expected use of an account. For example, a ClassBusinessAccount may be a subclass of ClassAccount such that new accounts created by ClassBusinessAccount have a root object instance of class ClassBusinessAccount. A person skilled in the arts will readily understand that an unlimited number of ClassAccount subclasses are possible.

Creating a New Object Instance

Figure 19:
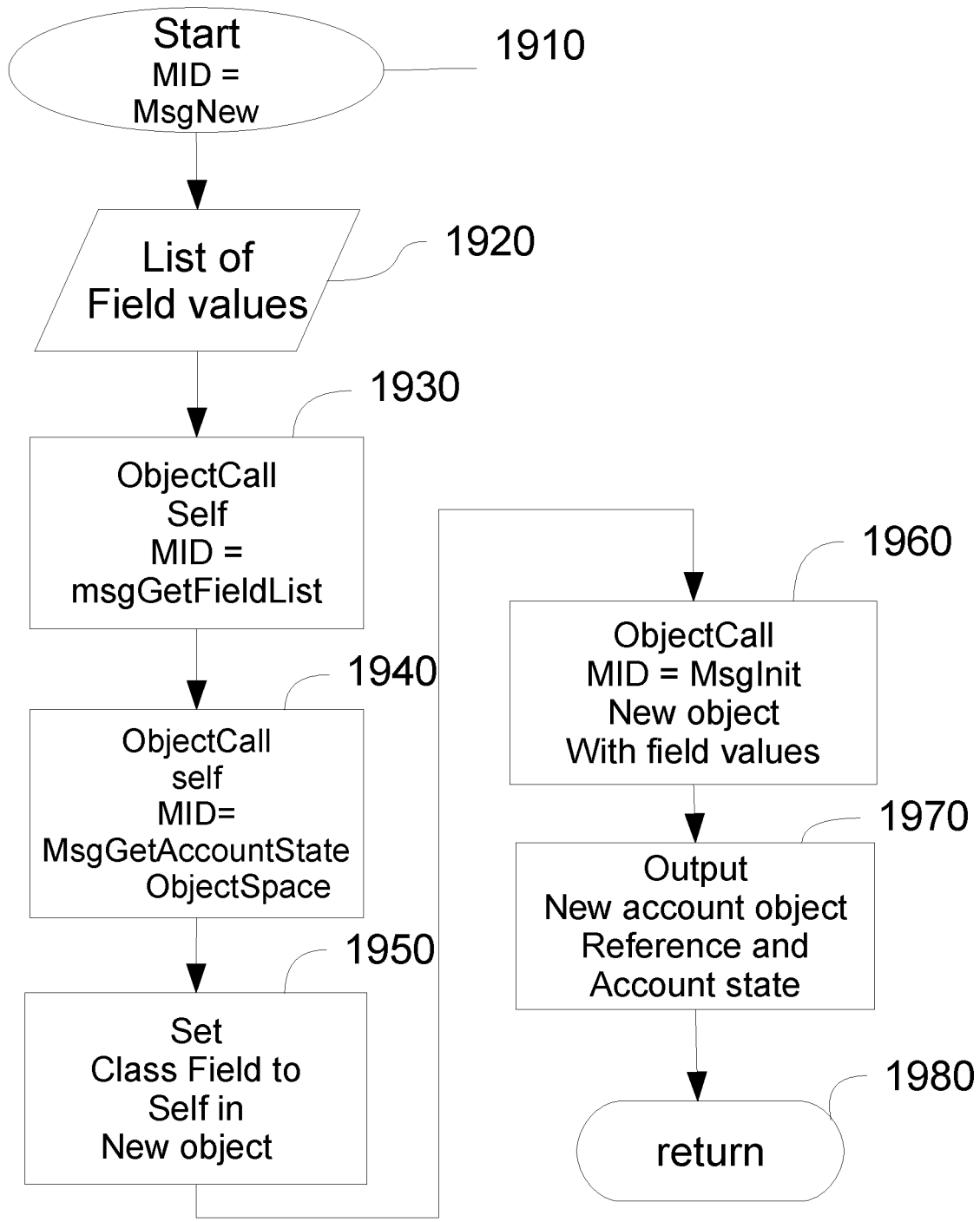
FIG. 19 is a drawing of a processing flowgraph of a class creating a new object instance of the class, in an account state space.

FIG. 19 illustrates creating a new object instance by passing a message with an MID to a class object instance referencing a method implemented to create a new object. The message is passed to the class object instance by the class manager infrastructure ObjectSend or ObjectCall intrinsic. At 1910 the MID is given the name MsgNew, where it is understood that the value of the MID is of the form given by 770. At 1920 arguments comprise a list of field values for the new object instance to be created by the class object instance receiving the message. It is understood that the list of field values may be position order dependent; be referenced by field reference 780; or be a mix of position order and by reference. At 1930 the ObjectCall class manager infrastructure intrinsic is used to pass msgGetFieldList to self, which is the class object instance that received msgNew. At 1940 the size of the field list returned by msgGetFieldList is passed in an ObjectCall to self with msgGetAccountStateObjectSpace. A method implementation for msgGetAccountStateObjectSpace eventually calls AllocateStateMemory class manager infrastructure intrinsic to allocate account state space FIG. 4 for the field list returned by msgGetFieldList. At 1950 the Class LOID field in the new object is set to the self LOID of the class object instance. At. 1960 the ObjectCall class manager infrastructure intrinsic is used to pass msgInit with the list of field values 1920 to the new object, which the new object's method implementation for msgInit uses to initialize default values and field values received in the list of field values. At 1970 a new object reference LOID and updated account state are output. Processing returns to caller at 1980.

A person skilled in the arts will readily understand that all message passing is implemented by ObjectSend, ObjectCall and ObjectCallAncestor class manager infrastructure intrinsics. All message transactions result in an ObjectSend call. There are no other means for a message transaction to execute a method on an object instance.

Creating a New Account

Creating a new account comprises: creating a new ledger account entry, and creating a new root object for the new account in the new account state space.

Figure 20:
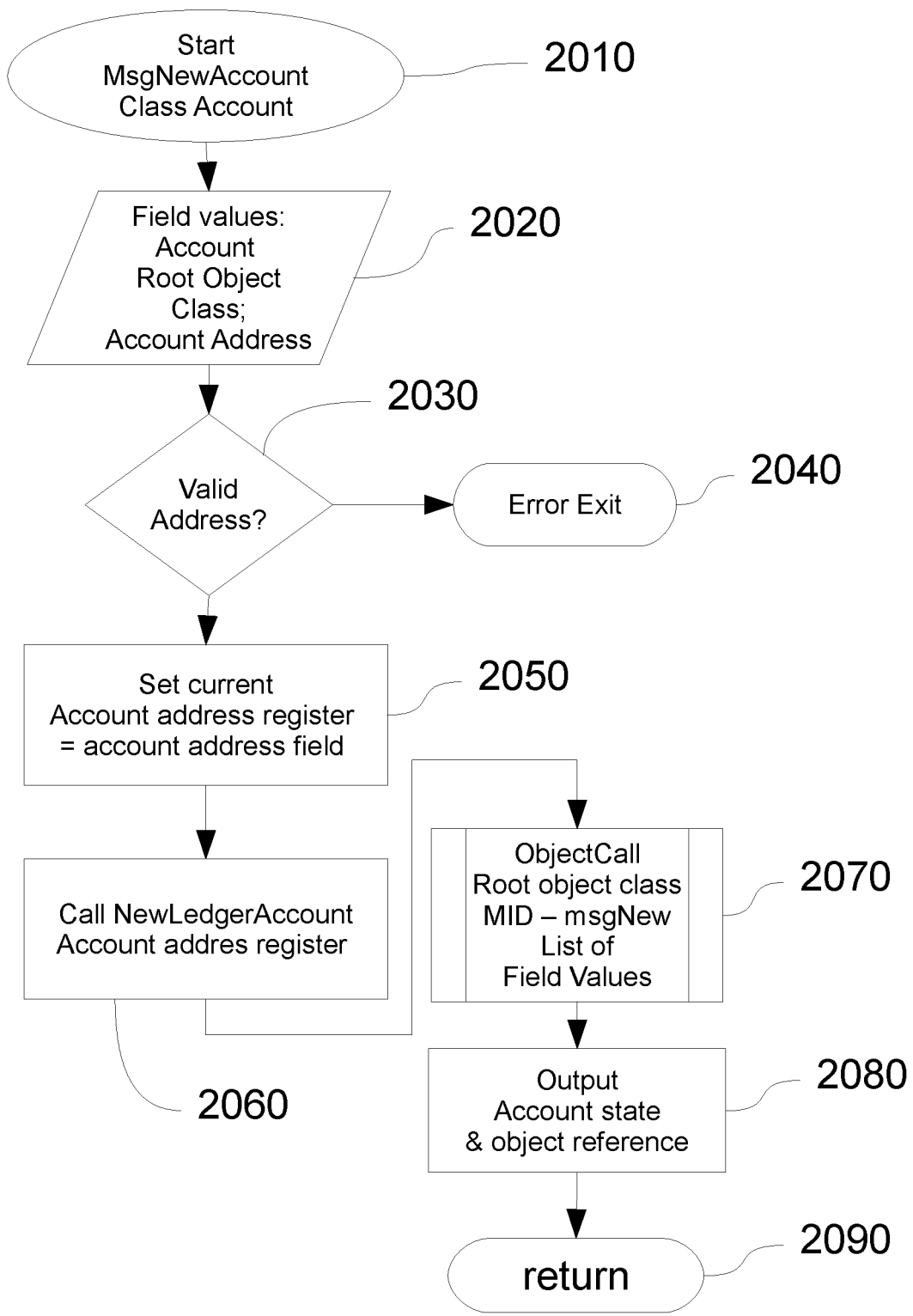
FIG. 20 is a drawing of a processing flowgraph of a ClassAccount creating a new account and account root object instance of the ClassAccount in the new account state space.

FIG. 20 illustrates creating a new account by passing a msgNewAccount to a ClassAccount object. Processing starts at FIG. 2010. At 2020 arguments comprise: an LOID of a class object to create the new account root object instance; a list of fields to initialize the root object instance (not shown in diagram); and a user's account address for the new account. At 2030 if the account address is invalid due to an incorrect format, the account address already exists, or any other reason, processing terminates at 2040.

At 2050 the current account address register 820 is set to the account address field. At 2060 a new ledger account is created by calling NewLedgerAccount class manager infrastructure intrinsic with the current account address register. A new ledger entry FIG. 5 is returned. At 2070 a new root object is created in the new account state space by passing a msgNew to the class object argument passed to msgNewAccount with the list of fields to initialize the new object. At 2080 an LOID to the new root object instance for the new account and the new account state are output. Processing returns to caller at 2090.

A person skilled in the arts will readily understand that ClassAccount serves as a factory for creating new accounts. Other class and object architectures may be used to create more complex account structures. If the class for the new account new root object instance is a metaclass, then the new root object instance will be a class object instance. Further, if the new object instance is a class that inherits eventually from ClassClass the new root object instance will be a metaclass.

Creating a New Class

A new class is created by sending a msgNew message to a metaclass object instance. A metaclass object instance is a class object instance that creates a new object instance of a new class. There is one root ancestor metaclass called ClassClass and referenced by a globally known LOID. All metaclasses inherit directly or indirectly from ClassClass.

Figure 21:
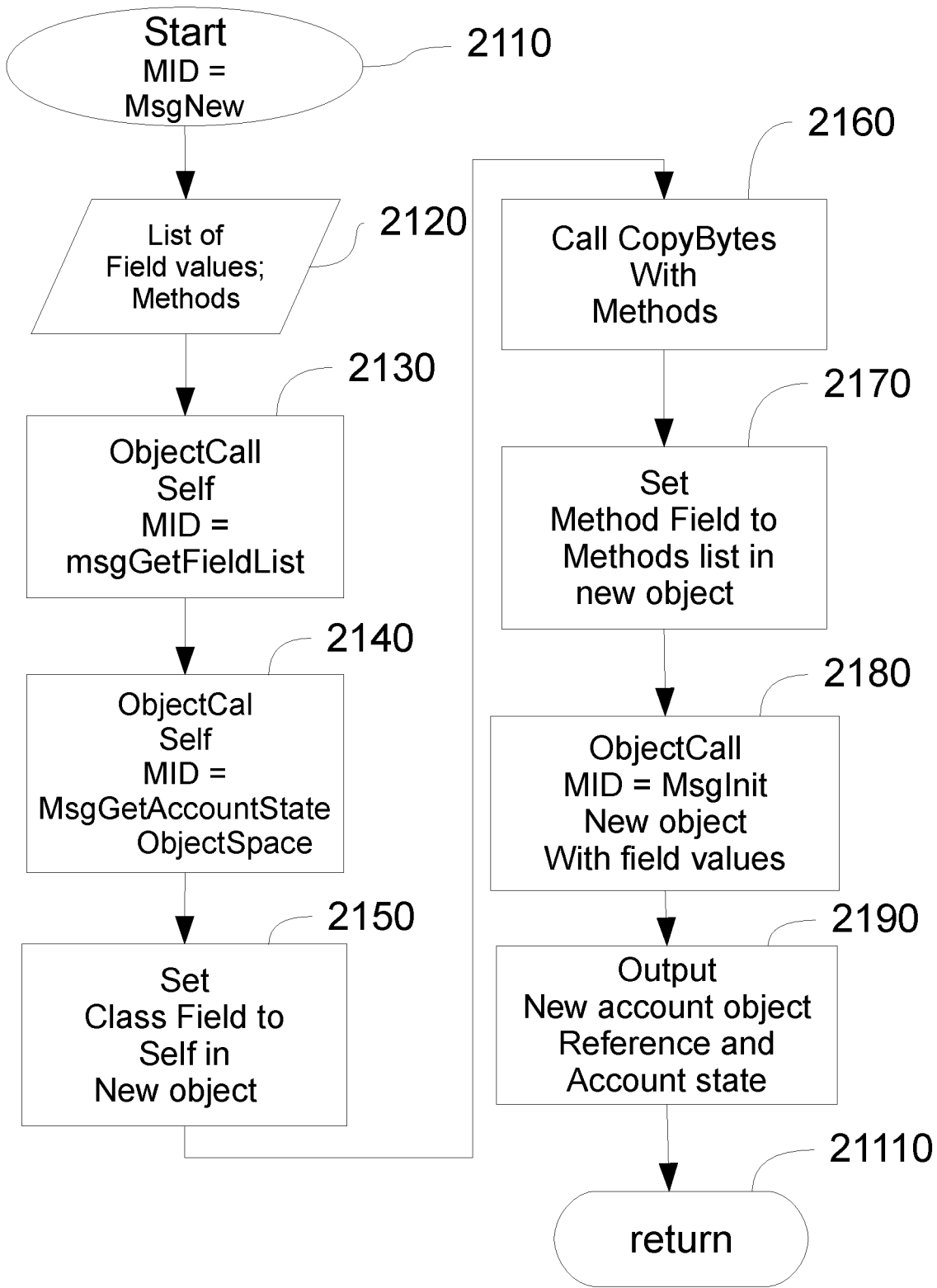
FIG. 21 is a drawing of a processing flowgraph of a MetaClass creating a new class in an account state space.

FIG. 21 illustrates creating a new class by passing a msgNew message 2110 to a metaclass object instance. At 2120 arguments comprise: a list of field values, and a list of method for the new class. A method comprises: a method signature; and a method implementation. A method signature may comprise: a MID; a list of parameter types; and optional configuration flags (e.g. CallAncestor before method call). A method implementation is a list of datawords comprising the method implementation code to be executed by the CallMethod class manager infrastructure intrinsic by the NEE.

At 2130 msgGetFieldList is passed to self, the metaclass object instance. At 2140 msgGetAccountStateObjectSpace is passed the size of the combination of the field list and methods in datawords, which uses AllocateStateMemory class manager infrastructure intrinsic to allocate account state space for the new object instance FIG. 4. At 2150 the Class LOID field in the new object is set to the self LOID of the class object instance. At 2160 CopyBytes class manager infrastructure intrinsic is used to copy the list of methods to the new object's account state space. At 2170 the offset to the account state space for the list of methods is set to the method field of the new object. At. 2180 the Object-Call class manager infrastructure intrinsic is used to pass msgInit with the list of field values 1920 to the new object, which the new object's method implementation for msgInit uses to initialize default values and field values received in the list of field values. At 2190 a new object reference LOID and updated account state are output. Processing returns to caller at 21110.

A person skilled in the arts will readily understand that the difference between a class creating a new object instance and a metaclass creating a new class instance is the inclusion of a method list. A user is able to create a new class on a blockchain or distributed ledger by sending a message transaction to a blockchain for a metaclass with a method list of implementation code for the new class. The message transaction to a metaclass is the only means for a user to create a new class with new code on a blockchain or distributed ledger.

Metaclass ClassClass msgInit Implementation

Figure 22:
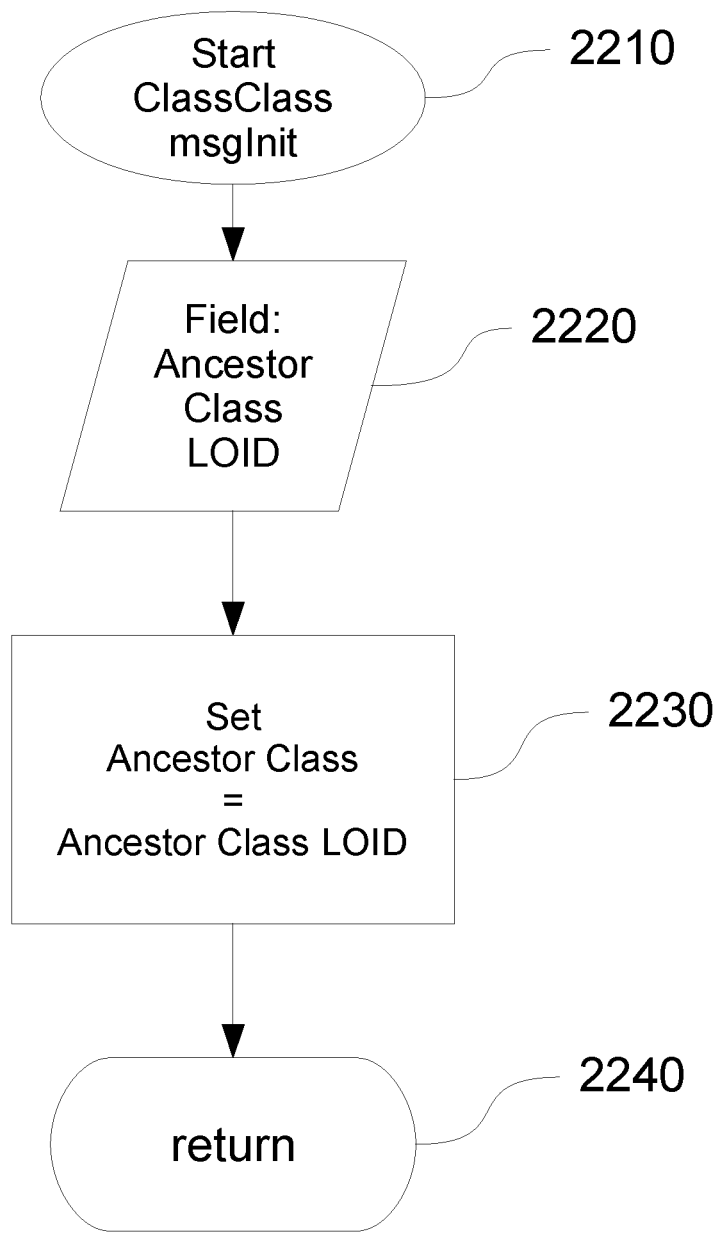
FIG. 22 is a drawing of a processing flowgraph of a MetaClass setting the ancestor class field of a new class in an account state space.

The metaclass ClassClass object's msgInit method initializes the field used by the class manager infrastructure to implement class inheritance. FIG. 22 illustrates the msgInit implementation. Processing starts at 2210. At 2220 arguments comprise an ancestor class LOID field. At 2230 the ancestor class LOID field of the new class object is set to the ancestor class LOID argument. Processing returns at 2240.

A person skilled in the arts will readily understand that the ancestor class for a new class can be any other class object including a metaclass object. Therefore, creating a new metaclass comprises setting the ancestor class field to an metaclass object. All metaclass objects eventually inherit from ClassClass.

Processed Transaction

Figure 23:
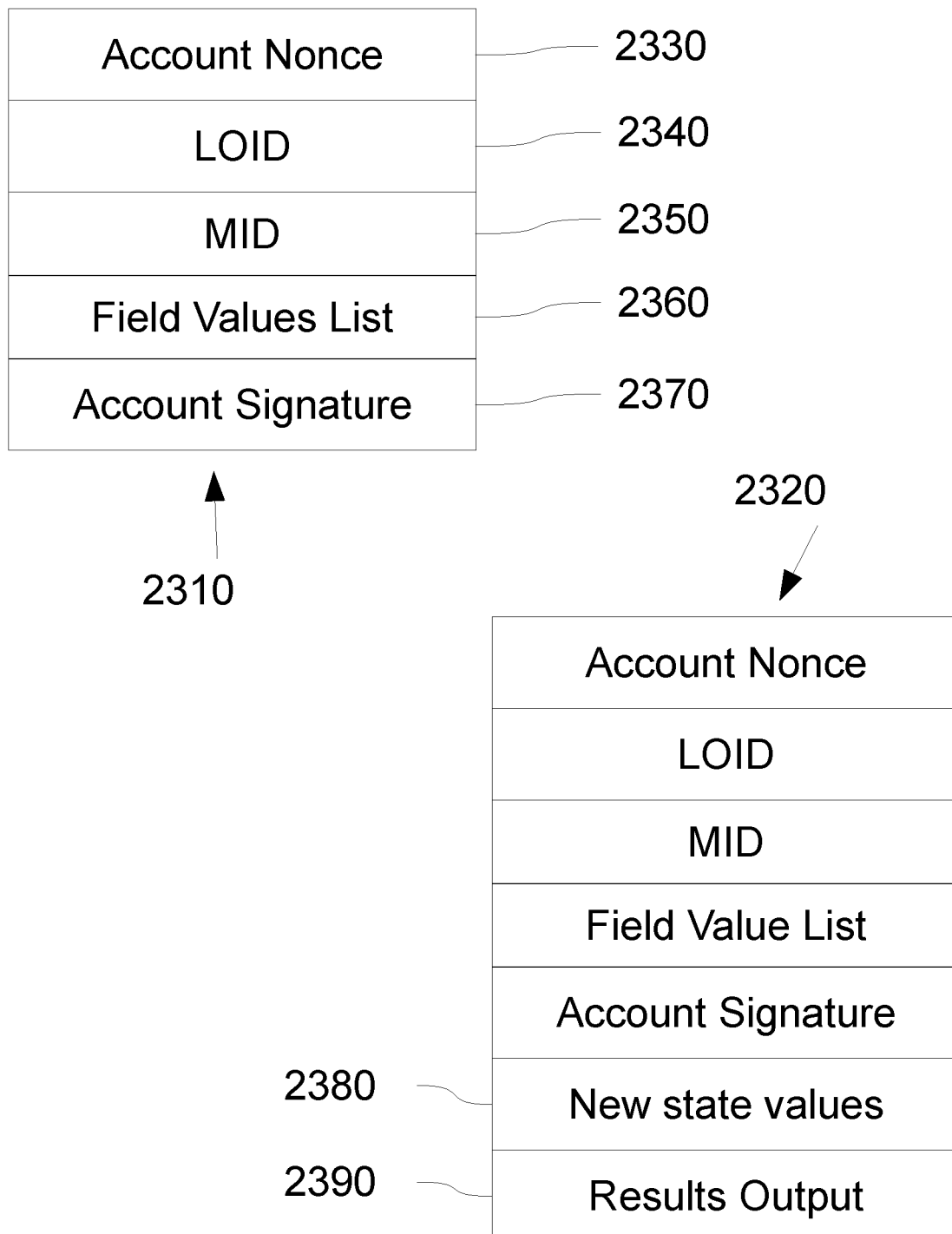
FIG. 23 is a drawing of a received transaction from a client, and an output processed transaction from an NEE.

FIG. 23 illustrates a transaction 2310 and a processed transaction 2320. A received transaction comprises: An account transaction nonce 2330; an object reference LOID 2340; a method reference MID 2350; arguments to a method referenced by MID, field values list 2360; a verifying account signature from the account owner 2370.

A processed transaction 2320, in addition to the data structure of 2310, comprises: a list of state values for one or more accounts 2380; and a list of results output from processing the transaction 2390.

Genesis Procedure

Passing messages to objects requires a reference to an object, which includes both an account address and an object reference within an account. New accounts and new objects are created by passing messages to existing object instances. At least one first ledger account entry and at least one first account with at least one object instance is needed before a first message may be passed. The first ledger account entry, the first account, the first object, and at least one genesis block are created manually in a genesis process. To bootstrap a blockchain or distributed ledger the genesis block is created manually as a one-time event. The genesis block comprises at least one transaction containing the class manager infrastucture code, and at least one transaction containing the bootstrap script code.

Figure 24:
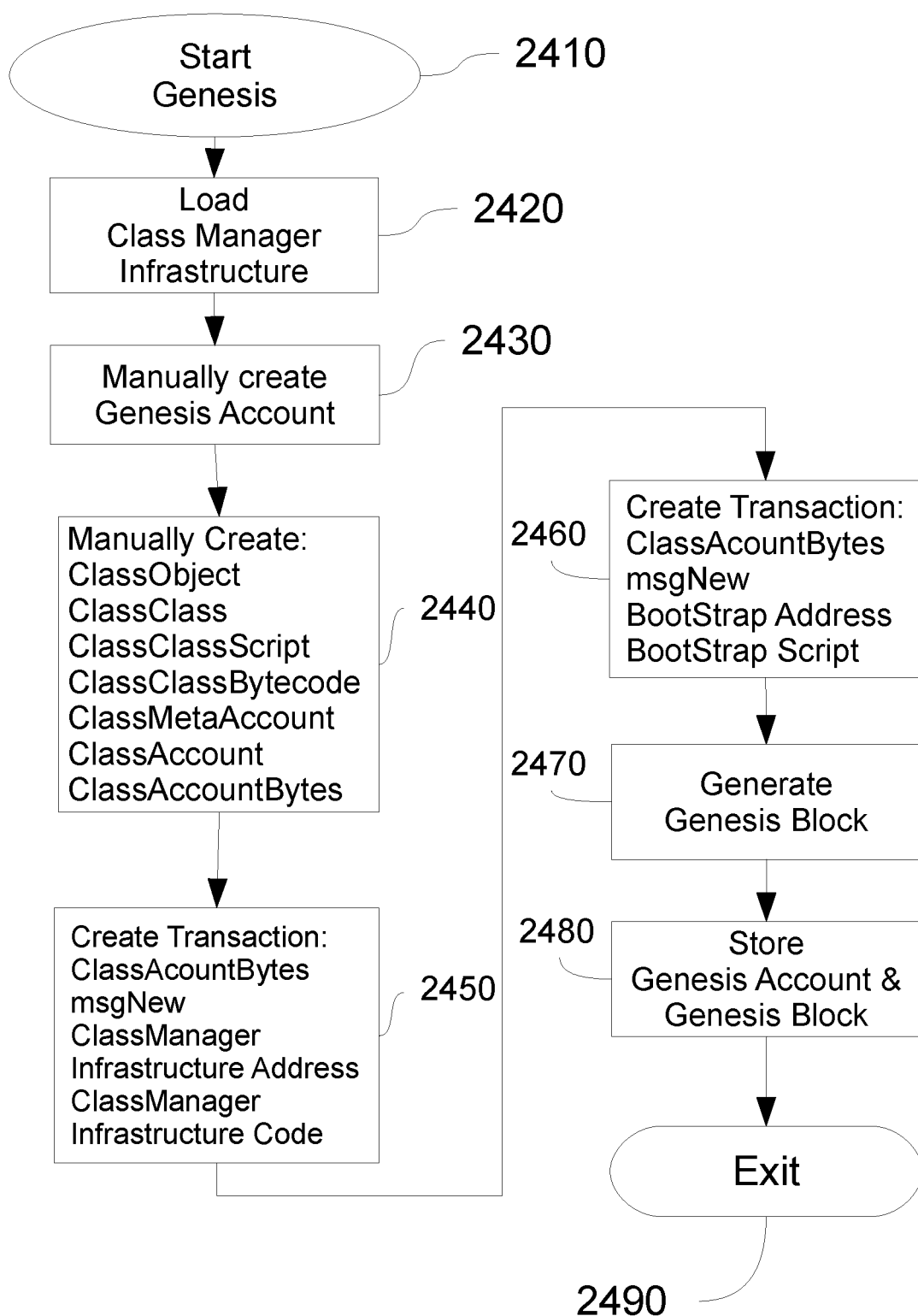
FIG. 24 is a drawing of a processing flowgraph of a genesis procedure for a blockchain supporting the XBOM described herein.

FIG. 24 illustrates a one-time genesis procedure. Processing starts at 2410. At 2420 the class manager infrastucture is loaded. At 2430 a genesis first account ledger account entry is created, which creates a first account. At 2440 classes are creating in the first account comprising: ClassObject the root class for all classes; ClassClass the root class for all metaclasses; ClassClassScript the metaclass for all new script language class loading; ClassClassBytecode the metaclass for all new bytecode language class loading; ClassMetaAccount the metaclass used to create ClassAccount; ClassAccount the class that creates new accounts; and ClassAccountBytes the subclass of ClassAccount that creates a new account and loads an array of bytes.

At 2450 a first transaction is created, sending a msgNew message to ClassAccountBytes with the arguments comprising: Class Manager Infrastructure Address as a new account address; and Class Manager Infrastructure code. At 2460 a second transaction is created, sending a msgNew message to ClassAccountBytes with the arguments comprising: Boostrap Address as a new account address; and BootStrap script as the code for starting a node execution engine FIG. 25.

At 2470 at least one genesis block 27150 is generated comprising the completed transactions. At 2480 the genesis block and the genesis first account ledger entry, and the first account are stored in a persistent computer storage device. Processing terminates at 2490.

Node Execution Engine Bootstrap

A node execution engine bootstrap procedure is depicted in FIG. 25 drawing. A process is started by a local node operating system at 2510 and proceeds to 2520 where arguments past to the process comprise: a value for a bootstrap account address 1510. At 2530 processing continues either with a node specific, previously locally stored, ledger account list and associated account states, or by creating foundation class object instances and ordinary object instances without any previously stored account list and associated account states. The path taken at 2530 may be determined by factors external to the operation of the node. In a first embodiment user input determines the processing path. In a second embodiment if an account list and associated account states is available, it is used to determine the processing path. A person skilled in the arts will readily understand that other factors may be used to choose once processing path over the other.

At 2550 a stored ledger account list and associated account states is loaded into node memory from a storage device. At 2560 a node execution engine is started in the process. At 2580 the bootstrap account address value is used to reference an account state space containing a bootstrap script 1540, which is loaded into the Node Local Data 1430. At 25110 the node execution engine is called with the bootscript starting at the first dataword of the bootstrap account state space.

At 2540 load stored genesis block 27150 which comprises: ledger account entries; class object instances; class manager infrastructure code; and bootstrap code sufficient for executing class manager infrastructure intrinsic; At. 2570 a node execution engine is started in the process. At. 2590 a previously local stored bootstrap ledger account entry and account state containing a bootstrap script is loaded into the Node Local Data 1430. At 25120 a replicated copy of a blockchain or distributed ledger is read and transactions processed to create a current ledger account list and associated account state in the Node Local Data. A person skilled in the arts will readily understand that a blockchain or distributed ledger may be read from a local attached storage device, received from one or more networked nodes, or by other means. At 25110 the node execution engine is called with the bootscript starting at the first dataword of the bootstrap account state space. A person skilled in the arts will readily understand that the loading and processing of blocks and transactions at 25120 makes use of class manager infrastructure intrinsic prior to executing the bootscript of 25110. The specific procedure entrypoints to the bootstrap code are specific to the implementation of the node process and may vary.

Genesis Account and Initial Account States

Figure 26:
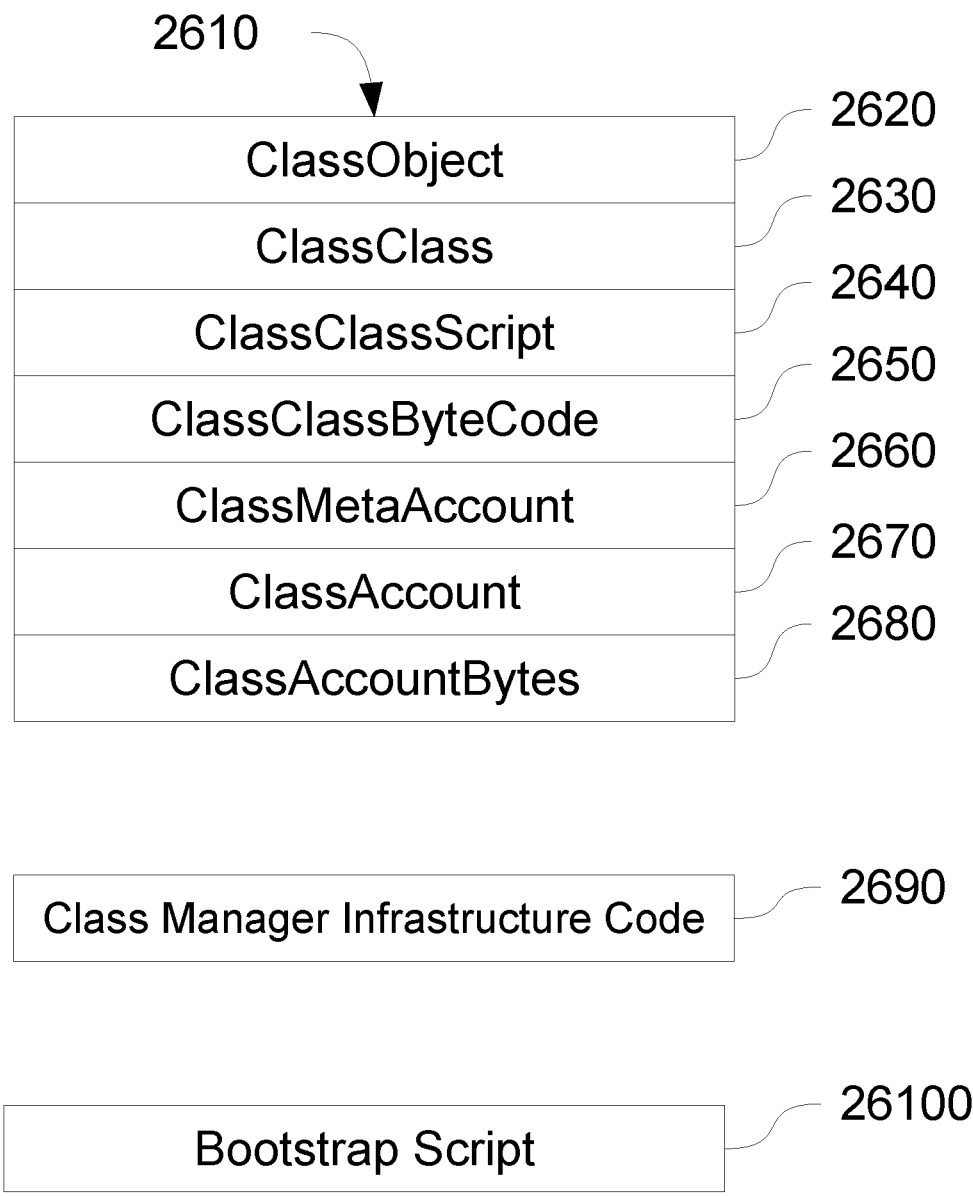
FIG. 26 is a drawing of classes created by a genesis procedure, and class manager infrastructure code and bootstrap script loaded by the genesis procedure.

A Genesis Procedure FIG. 24 creates first states for at least a genesis account; a class manager infrastructure account for the class manager infrastructure code; and a bootstrap account for a bootstrap script for a node. FIG. 26 illustrates contents of states for the accounts. At 2610 depicts state for the genesis account comprising a set of root class objects 2620, 2630, 2640, 2650, 2660, 2670, and 2680. At 2690 depicts state for the class manager infrastructure account comprising the class manager infrastructre code. At 26100 depicts state for the bootstrap account comprising the bootstrap code.

Genesis Ledger Account Entry, Genesis Transaction, and Genesis Block

Figure 27:
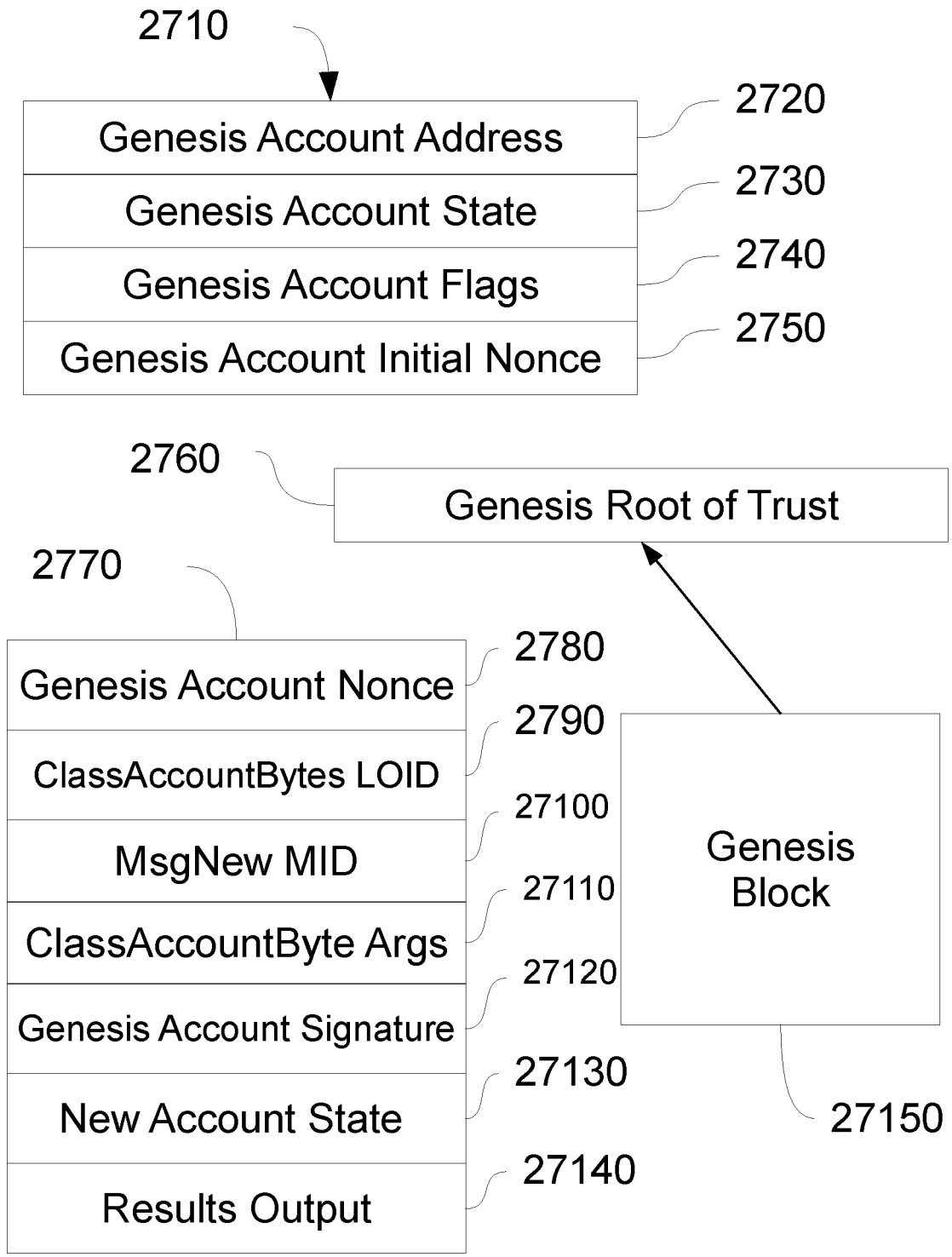
FIG. 27 is a drawing of a genesis ledger account entry, a genesis transaction data, a genesis root of trust, and a genesis block.

FIG. 27 illustrates several components created by the genesis procedure FIG. 24. At 2710 depicts a first account ledger entry. 2720, 2730, 2740, 2750 depict the values for the first account ledger entry: genesis account address; genesis account state; genesis account flags; and genesis account initial nonce respectively.

At 2770 depicts a processed first transaction sent to the first account ledger entry, which creates a new account by passing a msgNew message to ClassAccountBytes resulting in a new account containing an array of bytes sent in the msgNew arguments. At 2780 depicts the nonce value from the new account ledger entry 2710. At 2790 depicts the LOID of the ClassAccountBytes object 2670. At 27100 depicts the MID for msgNew sent to the ClassAccountBytes object. At 27110 depicts the arguments for the msgNew message to ClassAccountBytes object, which are defined as the Class Manager Infrastructure Account Address and the Class Manager Infrastructure Code 2450. At 27120 depicts an signature for the first transaction from the first account. At 27130 depicts a new state for a new account ledger entry created for the Class Manager Infrastructure Account Address. At 27140 depicts output results from processing of the first transaction.

Each block in a blockchain or distributed ledger includes at least one value from at least one previously referenced block as at least one security parameter for the blockchain. A first block in the blockchain does not have at least one previous block to reference. At least one first security parameter is referenced by the first block as a genesis for security for the blockchain. At least one first security parameter is depicted as Genesis Root of Trust 2760, which is referenced by a Genesis Block 27150, shown by a connecting arrow.

The Genesis Block 27150 contains the first transactions created by the Genesis Procedure FIG. 24, and is secured by the security parameters of the Genesis Root of Trust 2760.

Distributed Ledger Node Processing System

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 28:
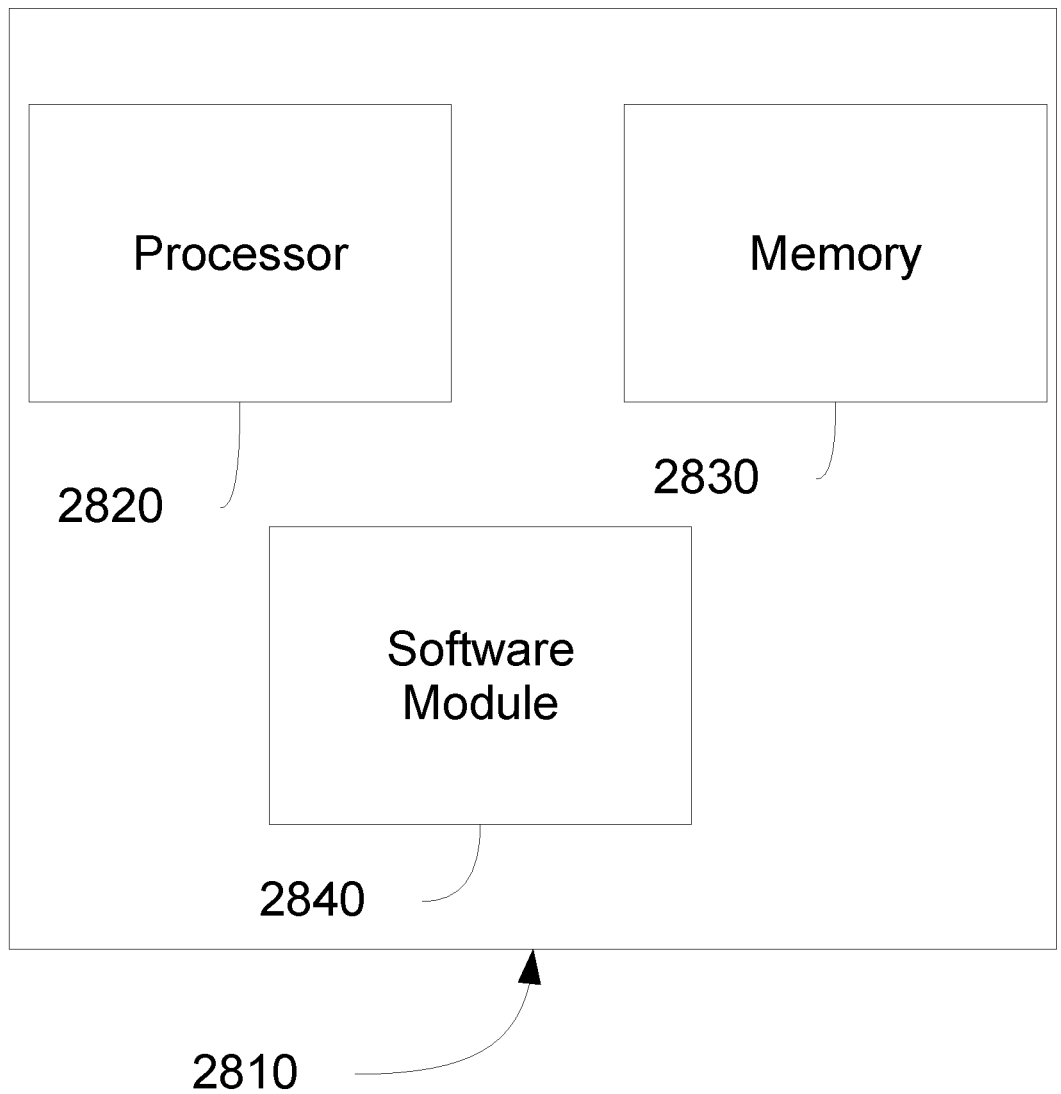
FIG. 28 is a drawing of an example blockchain node entity configured to support one or more of the example embodiments.

An exemplary storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. FIG. 28 illustrates an network element 2810, which may represent or be integrated in any of the above-described components, etc.

As illustrated in FIG. 28, a memory 2830 and a processor 2820 may be discrete components of a network entity 2810 that are used to execute an application or set of operations as described herein. The application may be coded in software in a computer language understood by the processor 2820, and stored in a computer readable medium, such as, a memory 2830. The computer readable medium may be a non-transitory computer readable medium that includes tangible hardware components, such as memory, that can store software. Furthermore, a software module 2840 may be another discrete entity that is part of the network entity 2810, and which contains software instructions that may be executed by the processor 2820 to effectuate one or more of the functions described herein. In addition to the above noted components of the network entity 2810, the network entity 2810 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the information sent or received by any of the modules may be sent or received directly and/or via one or more of the other modules.

One having ordinary skill in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In yet another embodiment a LOID may include additional information such as any of the following fields, and any number of instances of each of the fields: a field to hold a blockchain or distributed ledger identifier; a field to hold a subchain identifier of a blockchain or distributed ledger; a field to hold a subobject identifier of an object; a field to hold a subaccount identifier of a ledger account entry; a field to hold configuration and options data; and a field to hold arbitrary data.

In yet another embodiment a MID may include additional information such as any of the following fields, and any number of instances of each of the fields: a field to hold a blockchain or distributed ledger identifier; a field to hold a subchain identifier of a blockchain or distributed ledger; a field to hold a subobject identifier of an object; a field to hold a subaccount identifier of a ledger account entry; a field to hold a submessage identifier of a MID; a field to hold configuration and options data; and a field to hold arbitrary data.

In yet another embodiment an FID may include additional information such as any of the following fields, and any number of instances of each of the fields: a field to hold a blockchain or distributed ledger identifier; a field to hold a subchain identifier of a blockchain or distributed ledger; a field to hold a subobject identifier of an object; a field to hold a subaccount identifier of a ledger account entry; a field to hold a subfield identifier of an FI; a field to hold configuration and options data; and a field to hold arbitrary data.

In yet another embodiment a message signature matching intrinsic may create a signature to match against object methods comprising some or all of the following: an MID; types of some or all of the passed arguments; and values of some or all of the passed arguments.

In yet another embodiment object methods may be implemented in one or more of a plethora of programming languages. The implementation of the programming languages may be any of the following: interpreted scripts;

virtual machine interpreted bytecodes; CPU machine instructions; and custom computing hardware circuitry such as ASIC, GPU, FPGA.

In yet another embodiment the class manager infrastructure intrinsics may be implemented in a mix of one or more of a plethora of programming languages. The implementation of the programming languages may be any of the following: interpreted scripts; virtual machine interpreted bytecodes; CPU machine instructions; and custom computing hardware circuitry such as ASIC, GPU, FPGA.

In yet another embodiment the class manager infrastructure intrinsics may be loaded, individually and in groups, into a node in one or more of the following means: compiled to CPU machine instructions and statically linked in to a node application; compiled to CPU machine instructions and dynamically linked in to a node application, either at startup of the application, or during operation of the node as intrinsics are needed by operation of the node application; compiled to virtual machine bytecode instructions and statically linked in to a node application; compiled to virtual machine bytecode instructions and dynamically linked in to a node application, either at startup of the application, or during operation of the node as intrinsics are needed by operation of the node application; interpreted script code that is statically linked in to a node application; interpreted script code that is dynamically linked in to a node application, either at startup of the application, or during operation of the node as intrinsics are needed by operation of the node application; and any means that enables object methods to access the class manager infrastructure intrinsics.

In yet another embodiment one or more alternative genesis procedures and genesis data means may be used to bootstrap the XBOM on a blockchain or distributed ledger. Such alternative means may be one of the following: compiling and statically linking genesis data in to a node application; compiling and dynamically linking genesis data in to a node application; compiling and statically linking genesis procedures in to a node application; and compiling and dynamically linking genesis data in to a node application. One having ordinary skill in the art will recognize that other genesis procedures and genesis data means are possible.

In yet another embodiment the list of class objects and ordinary objects instantiated, new accounts created, new transactions created, and new blocks created as a result of a genesis procedure may vary from the lists creates as a result of the embodiment of the genesis procedure described herein.

In yet another embodiment class object instances may include version information where the version information may be used in an LOID field for referencing an object.

In yet another embodiment individual account, object instance, method, and field access may be limited any of the following ways and combinations thereof: an account state space may be read-only prohibiting state changes; an account may restrict receiving transactions and messages from accounts to a specified list; an account may restrict receiving transactions and messages to those comprising: specified permissions; signatures; other security parameters; or any combination thereof; a method may restrict execution of received messages to those from accounts to a specified list; a method may restrict execution of received messages to those comprising: specified permissions; signatures; other security parameters; or any combination thereof; a field may restrict read or write access from accounts to a specified list; and a field may restrict read or write access from accounts to those comprising: specified permissions; signatures; other security parameters; or any combination thereof. One having ordinary skill in the art will readily understand that other access limitation means are possible.

In yet another embodiment one or more class manager infrastructure intrinsics may implement traversal and iteration over a graph of object instances.

In yet another embodiment one or more class manager infrastructure intrinsics in combination with a LOID that includes a blockchain or distributed ledger identifier field may implement sending of messages between otherwise unrelated, independent blockchains.

In yet another embodiment an account ledger may be organized such that an account state space may contain a single object instance, such that an LOID may only require the account address field, and the object offset in the account state space is implied.

In yet another embodiment a blockchain or distributed ledger may have a plethora of shards each managing a, possibly overlapping, subset of ledger account entries and account state spaces. The subsets may change over time to optimize for a variety objectives comprising: optimized network resources; optimized compute resources; optimized memory resources; optimized transaction throughput; minimized transaction latency; and other optimization objectives.

In yet another embodiment class manager infrastructure intrinsics may implement configuration, control, and management of a node's operation. Such intrinsics may be encapsulated in objects in explicitly designated accounts with various security parameters.

In yet another embodiment class manager infrastructre intrinsics in combination with ClassObject and ClassClass specified fields may implement multiple inheritance of methods and fields of multiple class objects by object instances. A multiply inherited object instance is an instance of the set of all of the class objects and may be used anywhere an instance of any of the class objects may be used.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these embodiments, it would be apparent to those of skill in the art that certain modifications, variations, and alternative constructions would be apparent.

While embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method for processing one or more message passing transactions, said computer-implemented method comprising:
   creating a message passing transaction comprising;
   transmitting the message passing transaction to one or more distributed ledger nodes;

identifying an account and an object instance within an account state space of at least one node of the one or more distributed ledger nodes based on a data element in the message passing transaction;

passing the message passing transaction and one or more arguments to the object instance by calling a class manager infrastructure intrinsic;

resolving the message passing transaction, by the class manager infrastructure intrinsic, to one or more method implementations implemented in a class or an ancestor class of the object instance;

performing object-oriented inheritance by recursively resolving the message passing transaction to the one or more method implementations to the ancestor class or the class;

receiving output data from calling the one or more method implementations and any changes to one or more account state spaces;

creating a processed transaction comprising: the output data and one or more verification values of the changes to the one or more account state spaces; and adding the processed transaction to one or more distributed ledgers.

2. The computer-implemented method of claim 1 wherein the message passing transaction comprises:

a unique object identifier;

a message identifier, wherein the message identifier includes an account address, a class object instance reference, and a method reference; and arguments for the message identifier by a client.

3. The computer-implemented method of claim 2 wherein the unique object identifier comprises:

a ledger account address; and an object reference to an object instance in the one or more account state spaces.

4. The computer-implemented method of claim 1 wherein the one or more method implementations of the classes are in a format of computer machine instructions, bytecode virtual machine instructions, interpretable script code, or references to the bytecode virtual machine instructions, to the bytecode virtual machine instructions, or to the interpretable script code.

5. The computer-implemented method of claim 1 wherein the one or more verification values are a hash values over the changes to one or more account state spaces.

6. The computer-implemented method of claim 2 wherein resolving the message to the one or more method implementations by the class manager infrastructure intrinsic comprises the message identifier combined with a list of data types of the arguments matched against a method name associate with the one or more method implementations and a list of data types associated with parameters of the one or more method implementations.

7. The computer-implemented method of claim 1 wherein performing the object-oriented inheritance includes multiple inheritance by the class referencing a list of the ancestor class.

8. The computer-implemented method of claim 1 wherein the changes to the one or more account state spaces may include creating one or more object instances.

9. One or more tangible non-transitory computer-readable mediums storing computer program code instructions and associated data that, when coupled to, read, and executed by one or more computer processors, causes the one or more computer processors to perform operations comprising:

creating a message passing transaction comprising;

transmitting the message passing transaction to the one or more computer processors;

identifying an account and an object instance within an account state space of on one or more distributed ledgers based on a data element in the message passing transaction;

message passing transaction and one or more arguments to the object instance by calling a class manager infrastructure intrinsic;

resolving the message passing transaction, by the class manager infrastructure intrinsic to one or more method implementations implemented in a class or an ancestor class of the object instance;

performing object-oriented inheritance by recursively resolving the message passing transaction to the one or more method implementations to the ancestor class or the class;

receiving output data from calling the one or more method implementations and any changes to one or more account state spaces;

creating a processed transaction comprising: the output data, and one or more verification values of the changes to one or more account state spaces; and adding the processed transaction to one or more distributed ledgers.

10. The one or more tangible non-transitory computer-readable mediums of claim 9 wherein the message passing transaction comprises:

a unique object identifier;

a message identifier, wherein the message identifier includes an account address, a class object instance reference, and a method reference; and arguments for the message identifier by a client.

11. The one or more tangible non-transitory computer-readable mediums of claim 10, wherein the unique object identifier comprises:

a ledger account address; and an object reference to an object instance in the one or more account state spaces.

12. The one or more tangible non-transitory computer-readable mediums of claim 9, wherein the one or more method implementations of the classes are in a format of computer machine instructions, bytecode virtual machine instructions, interpretable script code, or references to the bytecode virtual machine instructions, to the bytecode virtual machine instructions, or to the interpretable script code.

13. The one or more tangible non-transitory computer-readable mediums of claim 9, wherein the one or more verification values are a hash values over the changes to one or more account state spaces.

14. The one or more tangible non-transitory computer-readable mediums of claim 10, wherein resolving the message identifier to the one or more method implementations by the class manager infrastructure intrinsic comprises the message identifier combined with a list of data types of the arguments and matched against a method name associate with the one or more method implementations and a list of data types associated with parameters of the one or more method implementations.

15. The one or more tangible non-transitory computer-readable mediums of claim 9, wherein performing the object-oriented inheritance includes multiple inheritance by the class referencing a list of the ancestor class.

16. The one or more tangible non-transitory computer-readable mediums of claim 9 wherein the changes to the one or more account state spaces may include creating one or more object instances.

17. A system, comprising:

one or more processors; and one or more computer-readable storage devices coupled to the one or more processors and having computer program code instructions and data stored thereon which, when coupled to, read, and executed by the one or more processors cause the one or more processors to perform operations comprising:

creating a message passing transaction comprising:

transmitting the message passing transaction to the one or more processors;

identifying an account and an object instance within an account state space of one or more distributed ledgers based on a data element in the message passing transaction;

passing the message passing transaction and one or more arguments to the object instance by calling a class manager infrastructure intrinsic;

resolving the message passing transaction, by the class manager infrastructure intrinsic to one or more method implementations implemented in a class or an ancestor class of the object instance;

performing object-oriented inheritance by recursively resolving the message passing transaction to the one or more method implementations to the ancestor class or the class;

receiving output data from calling the one or more method implementations and any changes to one or more account state spaces;

creating a processed transaction comprising: the output data and one or more verification values of the changes to the one or more account state spaces; and adding the processed transaction to one or more distributed ledgers.

18. The system of claim 17 wherein the message passing transaction comprises:

a unique object identifier;

a message identifier, wherein the message identifier includes an account address, a class object instance reference, and a method reference; and arguments for the message identifier by a client.

19. The system of claim 18 wherein the unique object identifier comprises:

a ledger account address; and an object reference to an object instance in the one or more account state spaces.

20. The system of claim 18 wherein resolving the message to the one or more method implementations by the class manager infrastructure intrinsic comprises the message identifier combined with a list of data types of the arguments matched against a method name associate with the one or more method implementations and a list of data types associated with parameters of the one or more method implementations.

* * * * *